(12) United States Patent
Richard et al.

(10) Patent No.: US 12,447,488 B2
(45) Date of Patent: Oct. 21, 2025

(54) DISPENSER WITH A VISUAL INDICATION SYSTEM

(71) Applicant: S.C. JOHNSON & SON, INC., Racine, WI (US)

(72) Inventors: Jesse Richard, Racine, WI (US); Michael Haynes, Muskego, WI (US); Richard Watson, Norwell, MA (US); Seth Frankel, Arlington, MA (US)

(73) Assignee: S. C. JOHNSON & SON, INC., Racine, WI (US)

( * ) Notice: Subject to any disclaimer, the term of this patent is extended or adjusted under 35 U.S.C. 154(b) by 163 days.

(21) Appl. No.: 16/743,933

(22) Filed: Jan. 15, 2020

(65) Prior Publication Data
US 2021/0213471 A1    Jul. 15, 2021

(51) Int. Cl.
*B05B 11/00* (2023.01)
*A61L 9/14* (2006.01)
*B05B 12/00* (2018.01)

(52) U.S. Cl.
CPC ............ *B05B 11/0005* (2013.01); *A61L 9/14* (2013.01); *B05B 12/004* (2013.01); *A61L 2209/12* (2013.01)

(58) Field of Classification Search
CPC ..... A61L 2209/12; A61L 9/14; B05B 12/004; B05B 11/0005
USPC ................................................. 239/35, 71–74
See application file for complete search history.

(56) References Cited

U.S. PATENT DOCUMENTS

| | | | |
|---|---|---|---|
| 3,131,121 A | 4/1964 | Gans | |
| 8,821,171 B2 | 9/2014 | Belongia | |
| 8,858,236 B2 | 10/2014 | Richard | |
| 9,833,530 B2* | 12/2017 | Gordon | A61L 9/12 |
| 2008/0279731 A1* | 11/2008 | Goreham | A61L 9/037 422/125 |
| 2009/0201673 A1 | 8/2009 | Smathers | |
| 2014/0034748 A1* | 2/2014 | Adair | H05B 1/0225 239/6 |
| 2014/0037273 A1 | 2/2014 | Jaworski et al. | |
| 2015/0182415 A1 | 7/2015 | Olkowski et al. | |
| 2018/0103507 A1 | 4/2018 | Davis et al. | |
| 2019/0091365 A1 | 3/2019 | Pieper et al. | |
| 2019/0110519 A1 | 4/2019 | Meyer et al. | |

FOREIGN PATENT DOCUMENTS

| | | |
|---|---|---|
| CN | 105276737 A | 1/2016 |
| CN | 206548861 U | 10/2017 |
| CN | 209033267 U | 6/2019 |
| EP | 3165839 A1 | 5/2017 |
| JP | H09201155 A | 8/1997 |
| JP | 2004267197 A | 9/2004 |
| JP | 2005074788 A | 3/2005 |
| JP | 2009537279 A | 10/2009 |

(Continued)

OTHER PUBLICATIONS

International Search Report from corresponding PCT Application No. PCT/US2021/012911, dated May 19, 2021 (5 pages).

(Continued)

*Primary Examiner* — Chee-Chong Lee
(74) *Attorney, Agent, or Firm* — Quarles & Brady LLP

(57) ABSTRACT

A light ring for a flowable medium dispenser includes an annular shape and is coupled to a body of a dispenser.

14 Claims, 21 Drawing Sheets

(56) References Cited

FOREIGN PATENT DOCUMENTS

| JP | 2011508621 A | 3/2011 |
| JP | 2017504454 A | 2/2017 |
| JP | 2019017985 A | 2/2019 |
| WO | 03099452 A1 | 12/2003 |
| WO | 2017030768 A1 | 2/2017 |
| WO | 2017178931 A1 | 10/2017 |
| WO | 2018112507 A1 | 6/2018 |

OTHER PUBLICATIONS

Written Opinion of the International Searching Authority from corresponding PCT Application No. PCT/US2021/012911, dated May 19, 2021 (5 pages).
Search Strategy Report, from corresponding PCT Application No. PCT/US2021/012911, dated May 19, 2021 (1 page).
Argentinian Office Action from corresponding application 20210100085 dated Jul. 16, 2024, 10 pages.
Japanese Patent Office, Notice of Reasons for Refusal, Application No. 2022-543162, Nov. 5, 2024, 11 pages.
European Patent Office, Communication pursuant to Article 94(3) EPC (Examination Report), Application No. 21703342.2, Jun. 2, 2025, 4 pages.

\* cited by examiner

DISPENSER WITH A VISUAL INDICATION SYSTEM

CROSS REFERENCE TO RELATED APPLICATIONS

Not applicable.

REFERENCE REGARDING FEDERALLY SPONSORED RESEARCH OR DEVELOPMENT

Not applicable.

SEQUENTIAL LISTING

Not applicable.

BACKGROUND OF THE INVENTION

1. Field of the Invention

The present disclosure relates generally to a system for dispensing a composition, and more particularly, to a dispenser that uses an indication system to generate use and efficacy indicators.

2. Description of the Background of the Invention

Users of consumer products typically purchase a composition to accomplish a specific household task. For example, a user may desire to spray a pest control agent within or outside of a home to control pests. Alternatively, a user may purchase an air freshening device to fragrance and/or deodorize a home. In some instances, it is desirable to dispense a composition instantly, e.g., dispensing a pest control composition onto or in the area of a pest to exterminate, repel, or otherwise eliminate the pest. In other instances, it is desirable to dispense a composition over a prolonged period of time to achieve a desired outcome, e.g., dispensing a fragranced composition, or a deodorant or odor neutralizer, in a room of a home to continually provide a pleasant smell therein, or remove an odor therein, respectively. In yet other instances, it is desirable to dispense a composition that provides both an instantaneous result followed by an extended action of the same or another composition to accomplish a longer term result.

One particular obstacle with respect to existing dispensing systems is notification to the user that the composition has been actively released in conjunction with notification that the composition is continuing to provide the desired effect for a time period after the initial release (e.g., passive release). Further, existing dispensing systems commonly lack indication of low levels of composition, and, thus, the user may not know when the dispensing system is empty. Some prior art systems provide an initial indicator that the composition is in use when the system is first turned on, set-up, or otherwise provided to the user at its initial use stage. In some instances, notification is provided to the user via an audible indicator. In other instances, notification is provided to the user via a visual indicator.

Difficulties arise through the use of some visual and audible indicators, however. For example, in some instances, the audible and visual indicators are transitory and generally do not provide the user any indication of continued efficacy. In other instances, the visual indicators are electronic and provided in the form of an LED or other light. In these systems, the LED is typically provided as a very small bulb that flashes quickly to indicate use. The bulbs may be difficult for some individuals to see due to size constraints on the bulb. Furthermore, bulbs are more expensive and add additional complication and expense to the manufacturing process of the systems.

In other systems, a spray may be generated during actuation. The spray may provide a visual indicator of the active emission status of the system. Unfortunately though, many systems spray into a housing that conceals the spray, and thus, the visual indicator is hidden.

Therefore, a need exists for a system that provides user indication effectively. More preferably, a need exists for a system that notifies a user of an emission status of the system. It is preferred that a system use visual indicators to communicate the operation and effectiveness of the system to the user.

SUMMARY OF THE INVENTION

According to one embodiment, a light ring for a flowable medium dispenser includes an annular shape and is coupled to a body of a dispenser.

According to another embodiment, a dispenser includes a container configured to hold a flowable medium, and a mechanism for discharging the flowable medium. The dispenser is configured to be in a first operating state or a second operating state. A light ring is configured to emit a first visual indication when the dispenser is in the first operating state and a second visual indication when the dispenser is in the second operating state.

According to still another embodiment, a visual indicator for a flowable medium dispenser is a light that extends along the entire circumference of a body of the flowable medium dispenser. Further, the visual indicator is configured to emit at least two different visual indications.

According to another embodiment, a method of operating a flowable medium dispenser includes the steps of providing a power source to a flowable medium dispenser that includes a visual indicator, and dispensing a flowable medium. The visual indicator is a light ring that is configured to extend along a circumference of the flowable medium dispenser. Further, the visual indicator is configured to emit at least two different visual indications.

DETAILED DESCRIPTION

The present disclosure is generally directed toward dispensers for dispensing a flowable medium. For purposes of discussion herein, a particular exemplary embodiment will be expounded upon, which utilizes an aerosol-based volatile active-containing composition. However, it should be understood that the disclosed systems, regardless of whether described in connection with an aerosol, a volatile, a composition, etc., are not so bound and may be utilized with any number of liquids or fluids, which may be discharged by one or more of an aerosol system, a compressed gas system, a pump-type sprayer system, or any other means as known to one of ordinary skill.

Figure 1:
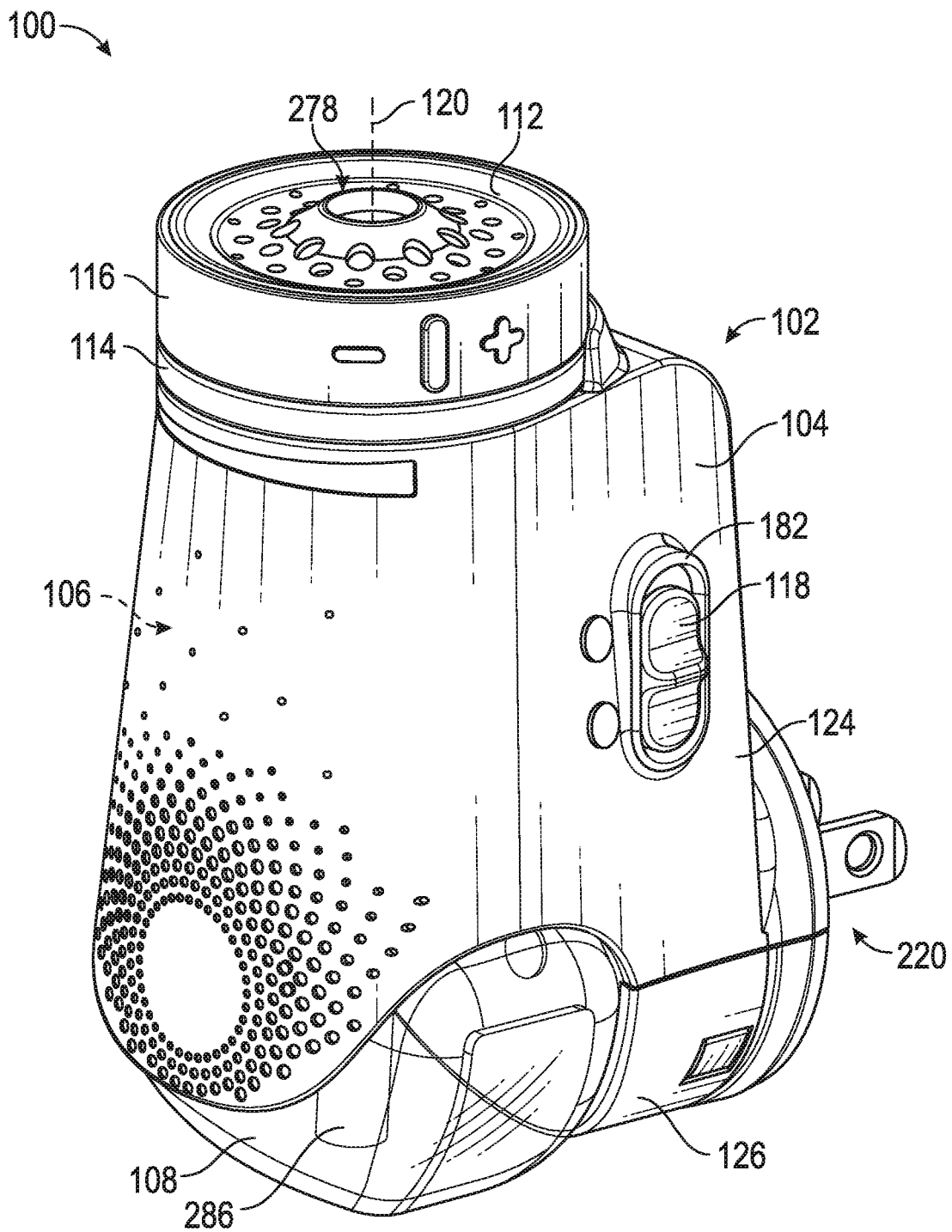
FIG. 1 is a front isometric view of a dispensing system including a dispenser and a container, according to an embodiment of the present disclosure.
Figure 2:
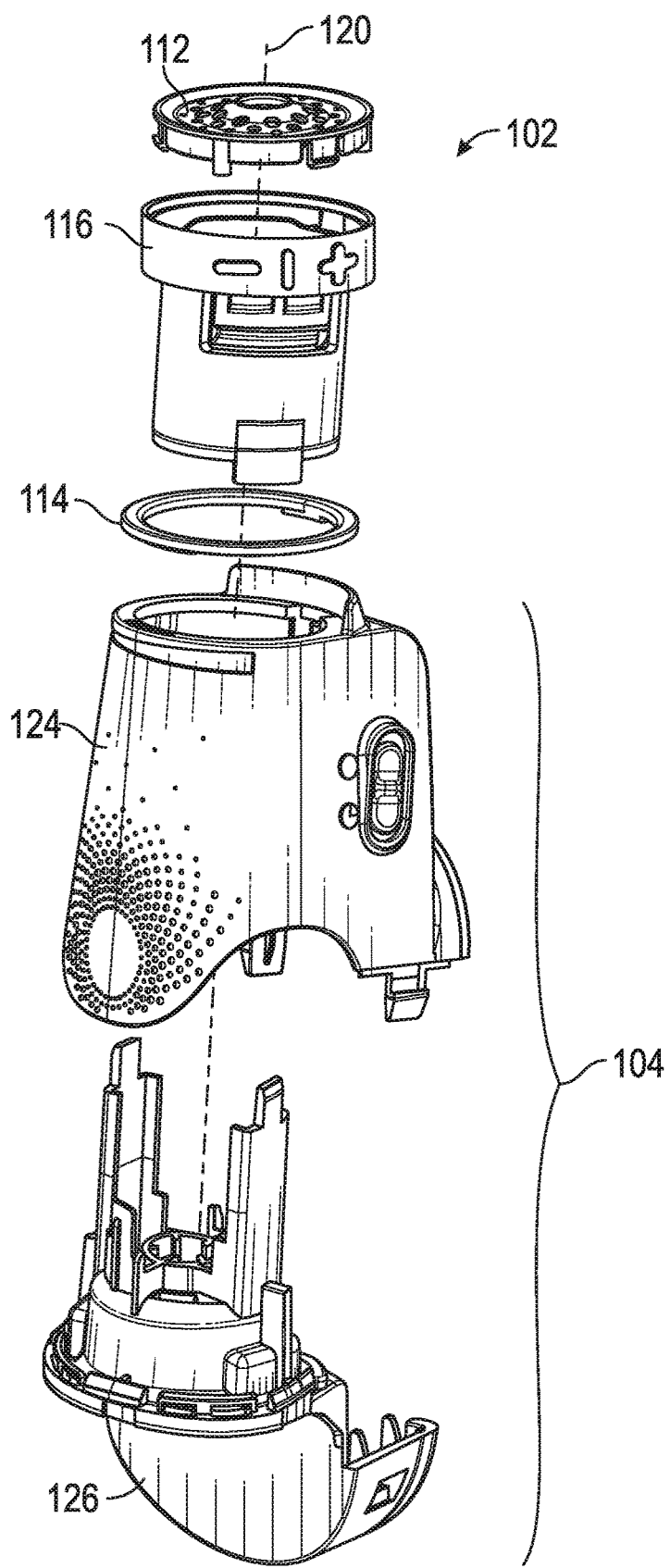
FIG. 2 is an exploded front isometric view of the dispensing system of FIG. 1.

The dispensers described herein may be used as plug-in devices, which are configured to be inserted into an outlet to be powered. Alternatively, aspects disclosed herein may be used in alternative dispensers, such as dispensers that are stand-alone devices or hand-held devices that are powered by a battery. FIGS. 1-30 illustrate one particular embodiment of a dispenser assembly 100 according to the present disclosure. Referring to FIG. 1, the dispenser assembly 100 comprises a dispenser 102 that generally includes a housing 104 having an internal cavity 106 for accepting a flowable medium container 108 and a diffusion element 110 (see, e.g., FIG. 9) disposed within the housing 104. The container 108 may be similar in structure and function to the container disclosed in U.S. application Ser. No. 16/045,165 filed on Jul. 25, 2018, the disclosure of which is incorporated by reference in its entirety. Alternatively, the container 108 could be refillable or otherwise refilled without removing and replacing the container. Furthermore, the diffusion element may be a heater, a fan, a piezoelectric element, or any other diffusion element known in the art. The diffusion element may be similar in structure and function to the heater arrangement disclosed in a U.S. patent application entitled "Dispenser with an Improved Heater Arrangement," which was filed on the same day by the same assignee as the present disclosure and is incorporated herein by reference in its entirety. The dispenser 102 further includes a top cover 112, a visual indicator 114, a control dial 116, and an optional switch 118. Each of the top cover 112, the control dial 116, the visual indicator 114, and the housing 104 are configured to be assembled together as shown by the exploded view of FIG. 2. When assembled, the dispenser 102 defines a longitudinal axis 120.

Figure 3:
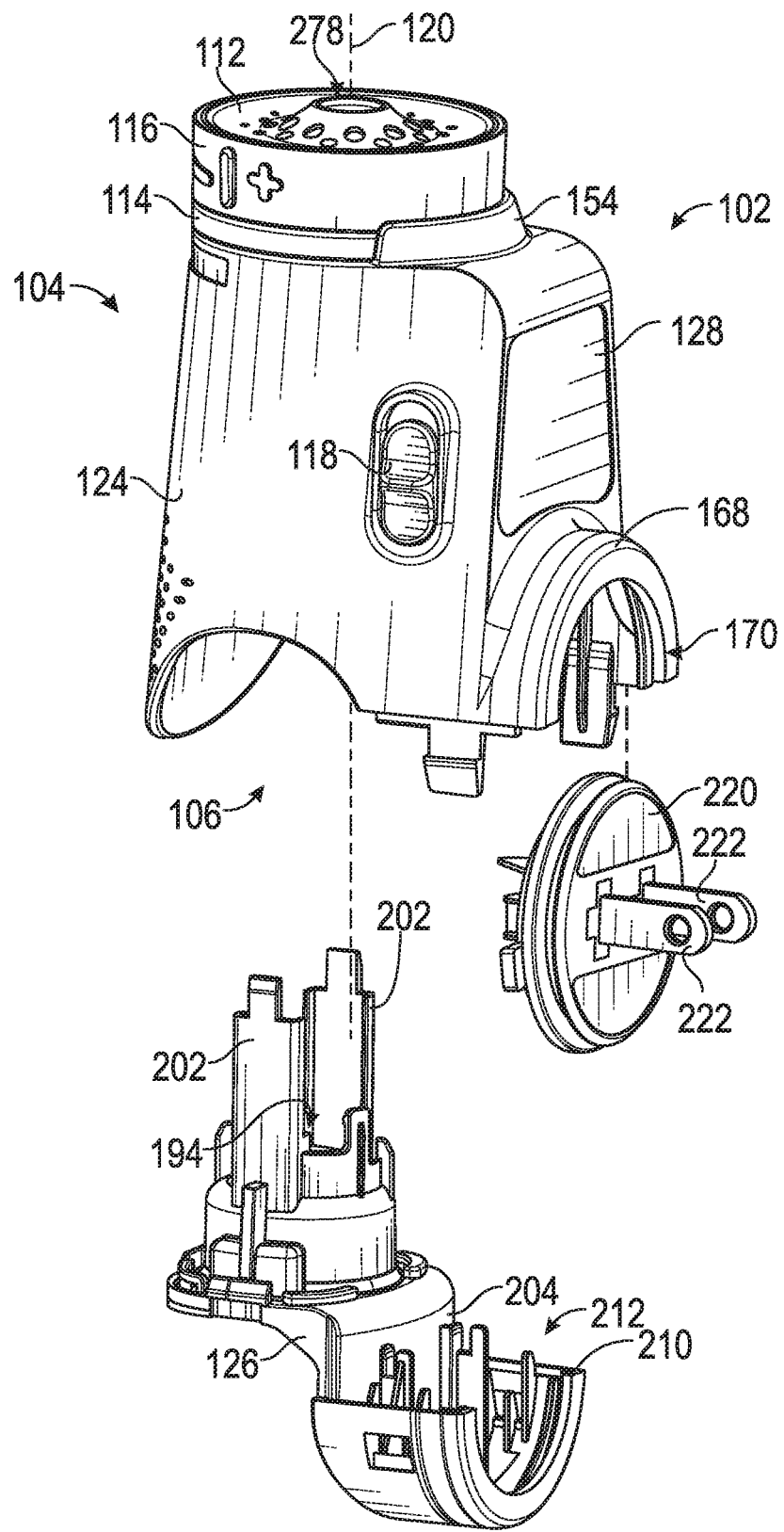
FIG. 3 is an exploded rear isometric view of the dispensing system of FIG. 1.

Now referring to FIG. 3, the housing 104 of the dispenser 102 generally includes an upper casing 124 and a lower casing 126 configured to be attached to each another to define the internal cavity 106. The upper casing 124 and the lower casing 126 may be formed of a thin walled plastic material and may be formed using known manufacturing methods, such as thermoforming or injection molding. Further, although the housing 104 according to the present embodiment comprises two components, i.e., the upper casing 124 and the lower casing 126, it should be understood that dispensers according to alternative embodiments may include housings that comprise more or fewer components.

Figure 4:
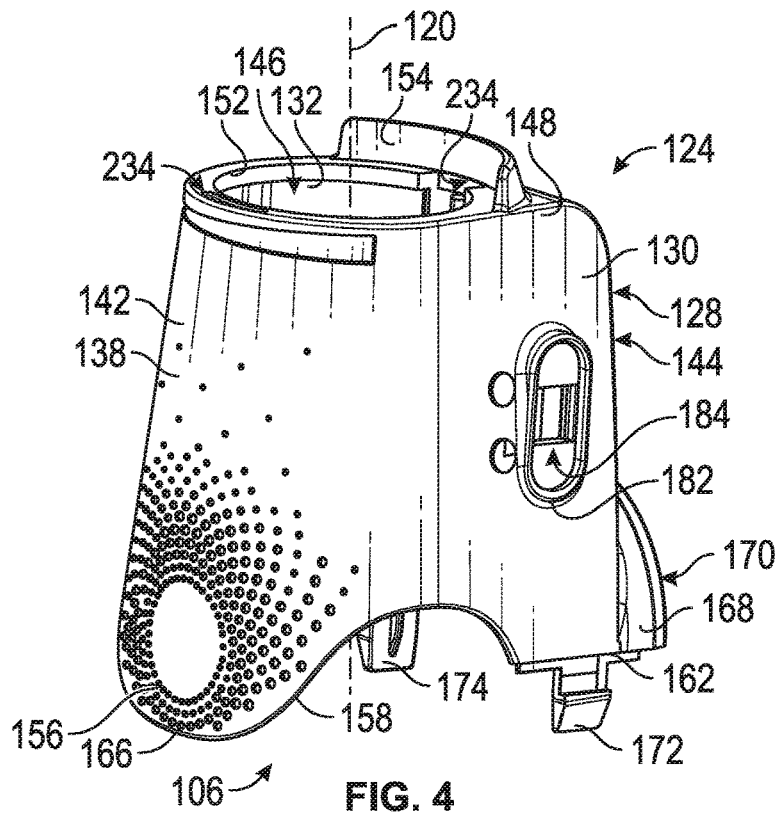
FIG. 4 is a front isometric view of an upper portion of a housing of the dispenser of FIG. 1.
Figure 5:
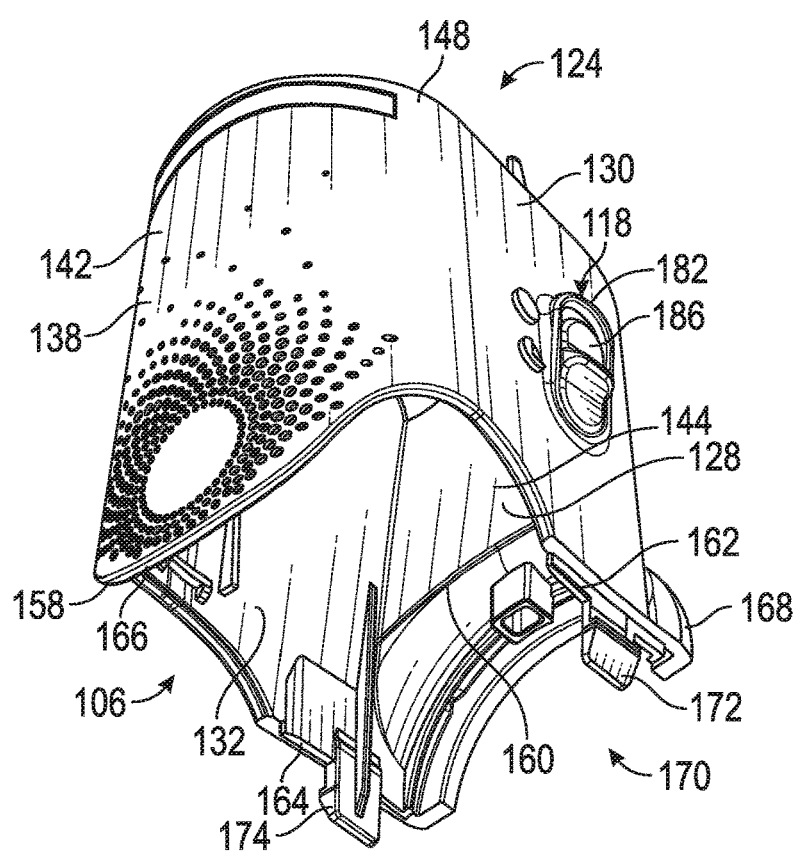
FIG. 5 is another front isometric view of the upper portion of FIG. 4.

FIGS. 4 and 5 illustrate isometric views of the upper casing 124. Referring particularly to FIG. 5, the upper casing 124 comprises a first wall 128 having a second wall 130 and a third wall 132 extending from opposing edges thereof. Each of the first wall 128, the second wall 130, and the third wall 132 is substantially planar, and the second wall 130 and the third wall 132 extend substantially perpendicularly from the first wall 128. A fourth wall 138 extends from the second wall 130 to the third wall 132 opposite the first wall 128. The fourth wall 138 is substantially hemi-cylindrical in shape, thereby defining a curved front face 142 as opposed to a planar rear face 144 defined by the first wall 128. Each of the first wall 128, the second wall 130, the third wall 132, and the fourth wall 138 are integrally formed to define the internal cavity 106.

Referring now to FIG. 4, the upper casing 124 of the housing 104 further includes a circular receiving aperture 146 disposed at a first upper end 148 thereof. An inwardly extending lip 152 extends from the upper casing 124 at the first upper end 148 to define the circular receiving aperture 146. Further, an upwardly extending lip 154 extends from the first upper end 148 adjacent the planar rear face 144. The upper casing 124 further includes a second upper end 156 that defines a lower edge 158. As best seen in FIG. 5, the lower edge 158 comprises a semicircular edge portion 160, a first straight edge portion 162 and a second straight edge portion 164 extending from opposing ends of the semicircular edge portion 160, and a curved edge portion 166 that extends between the first straight edge portion 162 and the second straight edge portion 164. A first hemi-cylindrical extension 168 extends from the semicircular edge portion 160 to define a first hemi-cylindrical chamber 170. The first straight edge portion 162 and the second straight edge portion 164 extend from the semicircular edge portion 160 and include a first latch 172 and a second latch 174, respectively. The first latch 172 and the second latch 174 extend substantially perpendicularly from the first straight edge portion 162 and the second straight edge portion 164, respectively, and are substantially coplanar with the second wall 130 and the third wall 132, respectively. Further, the first latch 172 and the second latch 174 are configured to mate with a first latch receiving structure 176 and a second latch receiving structure 178 of the lower casing 126 of the housing 104 (see, e.g., FIG. 7), respectively, which will be described below.

Referring particularly to FIG. 4, the upper casing 124 according to the illustrated embodiment may further include a raised frame 182 extending from the second wall 130 thereof to define a switch opening 184. In some embodiments, as shown in FIG. 5, an optional switch cover 186 may be provided within the raised frame 182 and configured to connect to a first switch arm (not shown) of the diffusion element 110 (see, e.g., FIG. 9) to provide certain controls, such as a timer to automatically turn the dispenser on and/or off. For example, a user may turn the switch on to implement a sleep state interval during which the dispenser 102 may automatically turn from an on state to a sleep state after a set amount of time (e.g., sixteen hours), which will be described in greater detail herein. The dispenser 102 may remain in the sleep state, in which the dispenser 102 is not actively dispensing a flowable medium, or dispensing a very low quantity of the flowable medium, for a set amount of time (e.g., eight hours) before returning to the on state.

Figure 6:
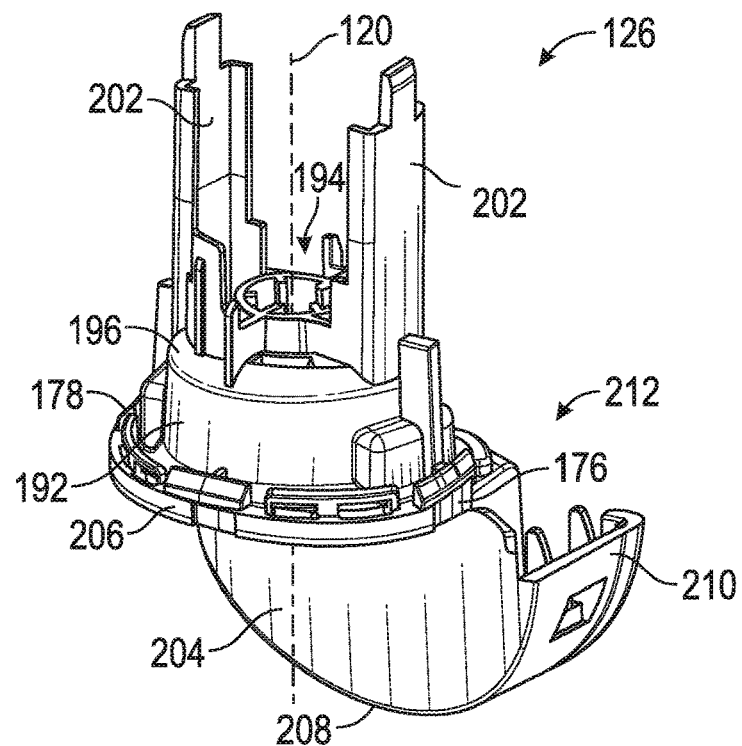
FIG. 6 is a front isometric view of a lower portion of a housing of the dispenser of FIG. 1.
Figure 7:
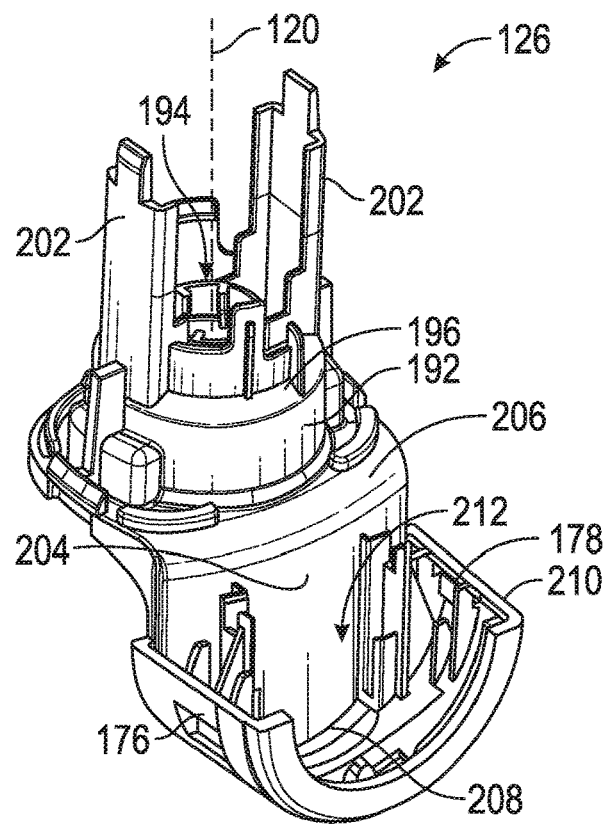
FIG. 7 is a rear isometric view of the lower portion of FIG. 6.

FIGS. 6 and 7 illustrate a front isometric view and a rear isometric view of the lower casing 126, respectively. The lower casing 126 comprises a cylindrical center portion 192 that defines a channel 194 at a lower first end 196 having fastening portions 198 (see, e.g., FIG. 30) extending downwardly therein. Two elongate guide posts 202 extend outwardly from the lower first end 196 of the lower casing 126 and are generally parallel to the longitudinal axis 120. A wall 204 extends from a lower second end 206 thereof to a semicircular edge 208, and a second hemi-cylindrical extension 210 extends from the semicircular edge 208 to define a second hemi-cylindrical chamber 212. Further, referring particularly to FIG. 7, the second hemi-cylindrical extension 210 of the lower casing 126 includes the first latch receiving structure 176 and the second latch receiving structure 178 that are configured to receive and secure the first latch 172 and the second latch 174 of the upper casing 124 (see, e.g., FIG. 4), respectively.

Figure 8:
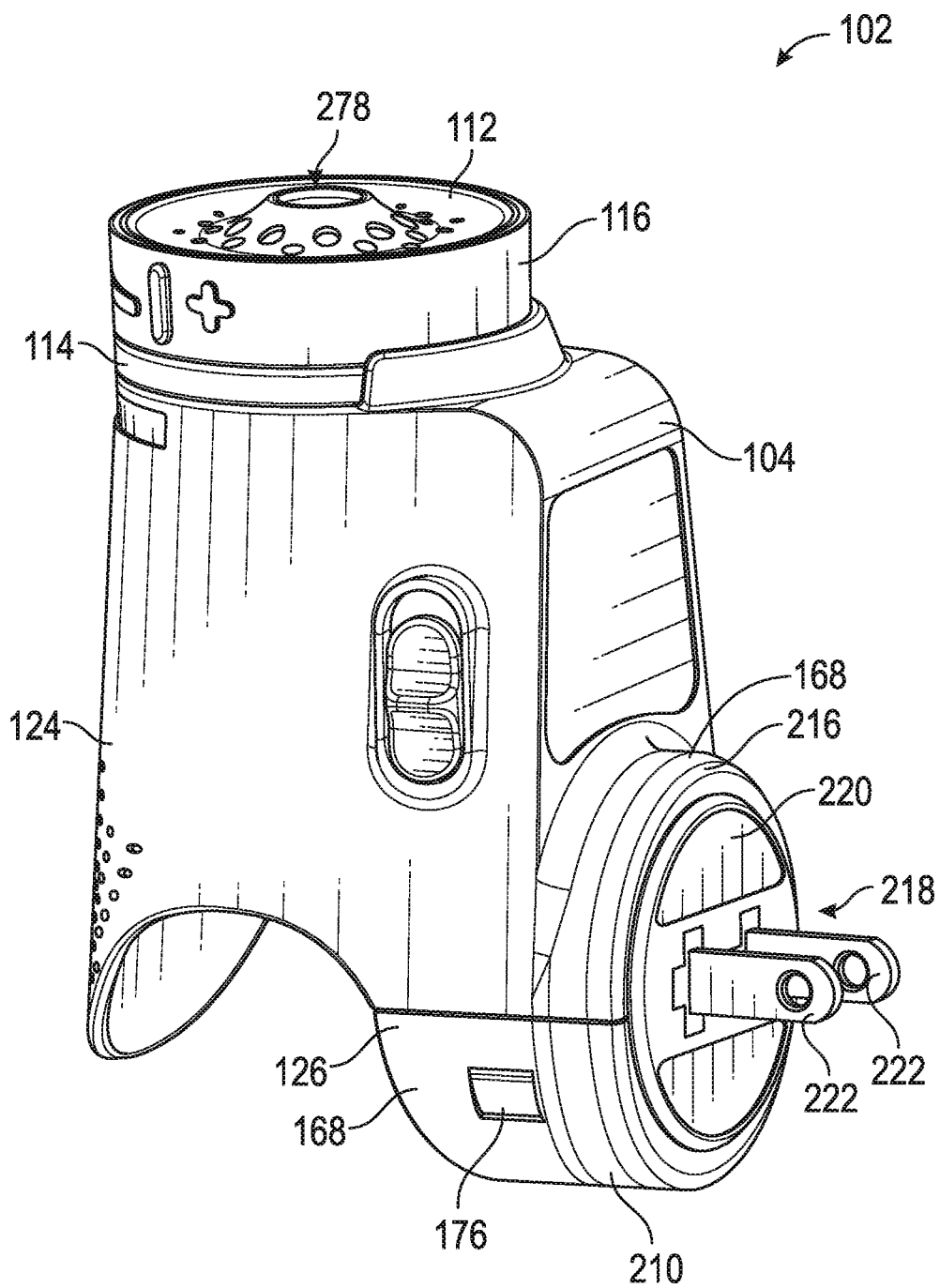
FIG. 8 is a rear isometric view the dispenser of FIG. 1 including a top cover, a control ring, and a visual indicator.

Returning to FIG. 3, the upper casing 124 and the lower casing 126 are configured to attach to each other. More specifically, the upper casing 124 is configured to receive the elongate guide posts 202 of the lower casing 126, and the first latch 172 and the second latch 174 of the upper casing 124 are configured to secure to the first latch receiving structure 176 and the second latch receiving structure 178 of the lower casing 126, respectively. Consequently, the first hemi-cylindrical extension 168 and the second hemi-cylindrical extension 210 create a cylindrical extension 216, thereby defining a cylindrical receiving chamber 218, which is configured to receive and retain a plug assembly 220 therein. As best seen in FIG. 8, the plug assembly 220 extends from the cylindrical receiving chamber 218 defined by the upper casing 124 and the lower casing 126 of the housing 104. The plug assembly 220 includes two electrical prongs 222 adapted for insertion into a conventional outlet. While the plug assembly 220 is shown as being a convention plug assembly for the United States, a plug assembly adapted for use in any other country may be used. In addition, the plug assembly 220 may include any features known in the art, for example, the plug assembly 220 may be partially or fully rotatable, similar to the plug assemblies disclosed in U.S. Pat. No. 8,821,171 filed on Sep. 22, 2011, and U.S. Pat. No. 8,858,236 filed on Oct. 28, 2011, the disclosures of which are incorporated by reference in their entirety.

Figure 9:
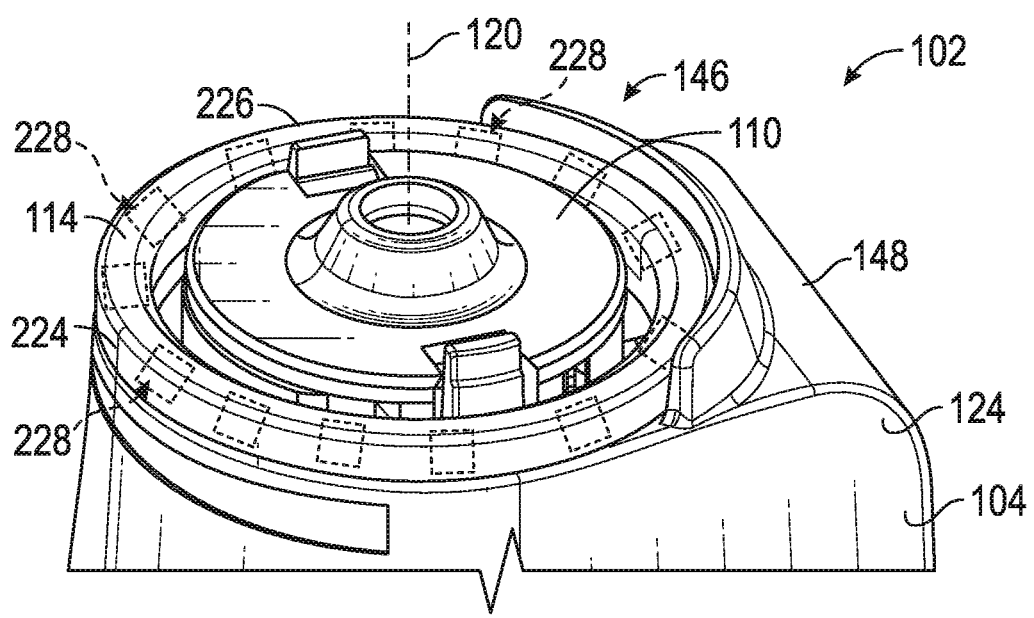
FIG. 9 is a partial isometric view of the dispenser of FIG. 8 with the top cover and the control ring removed.

Referring to FIG. 9, the upper casing 124 of the housing 104 may be configured to receive, couple to, or otherwise abut the visual indicator 114 at the first upper end 148 thereof. In the embodiment illustrated, the visual indicator 114 is a light ring 224 that can provide 360 degree visual indication to a user. Generally the light ring 224 comprises an annular body 226 and is provided to transmit light from a source therethrough. For example, as shown in the illustrated embodiment, the light ring 224 may be a solid ring preferably made of a translucent material, such as, e.g., acrylic or polycarbonate, that is configured to transmit light from one or more LEDs 228. In the illustrated embodiment, the LEDs 228 are disposed at the first upper end 148 of the upper casing 124 of the housing 104, and the light ring 224 is configured to rest on top of light emitting portions thereof. Therefore, the light ring 224 is separable from the housing 104 and is configured to transmit or diffuse light from the LEDs 228.

Figure 10:
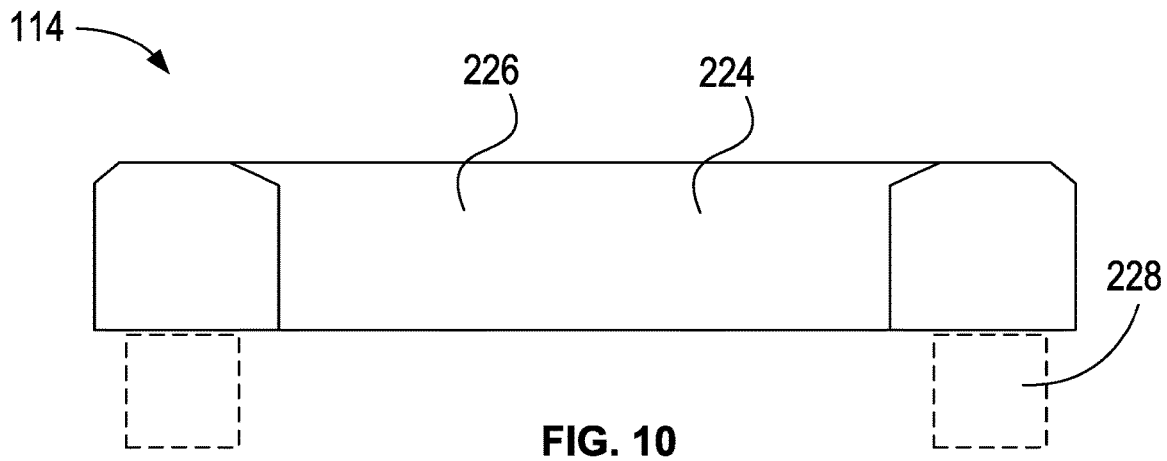
FIG. 10 is a schematic view of a visual indicator, according to an embodiment of the present disclosure.
Figure 11:
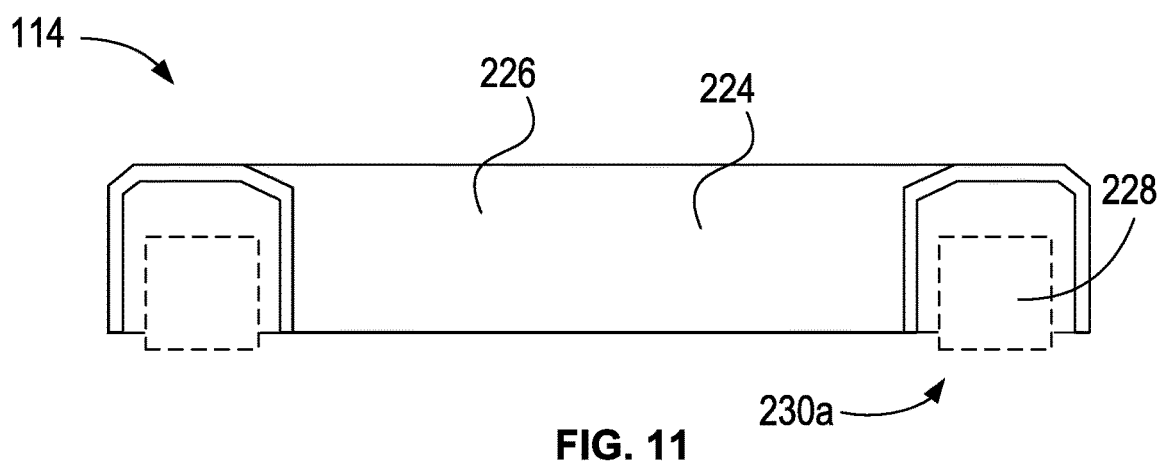
FIG. 11 is a schematic view of a visual indicator, according to another embodiment of the present disclosure.
Figure 12:
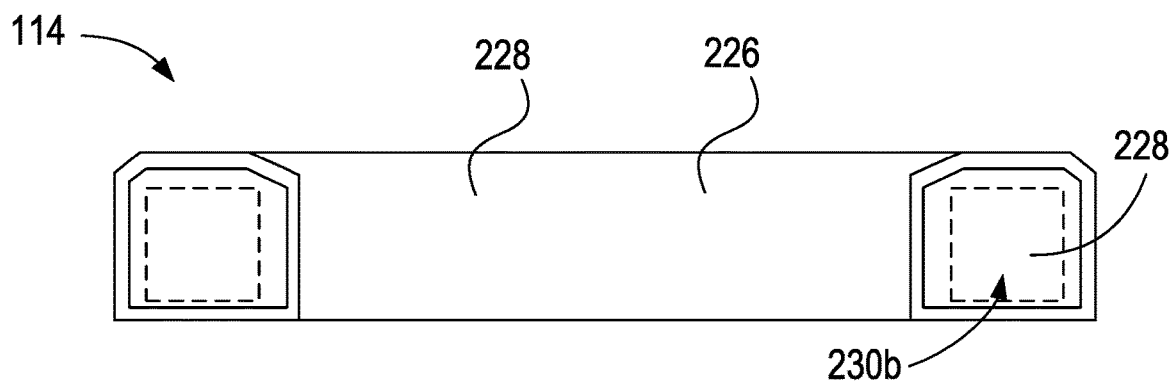
FIG. 12 is a schematic view of a visual indicator, according to still another embodiment of the present disclosure.

FIGS. 10-12 illustrate cross-sectional schematic views of the light ring 224 according to embodiments of the present disclosure. Referring to FIG. 10, the light ring 224 is shown as described above with regard to FIG. 9 having the solid annular body 226 that is disposed above the LEDs 228. Referring now to FIG. 11, in some embodiments, the annular body 226 of the light ring 224 may be configured to partially surround the LEDs 228 disposed at the first upper end 148 of the upper casing 124 (see, e.g., FIG. 9). That is, the annular body 226 of the light ring 224 may include an annular channel 230a provided along a length thereof that is configured to at least partially receive, cover, or surround the light emitting portions of the LEDs 228. In this case, the light ring 224 may be configured to snap onto the housing 104 (see, e.g., FIG. 9). Furthermore, in an alternative embodiment, referring to FIG. 12, the annular body 226 of the light ring 224 may be hollow so that it defines an annular cavity 230b that is configured to at least partially receive the LEDs 228 therein. Therefore, the light ring 224 may substantially surround the light emitting portions of the LEDs 228. In any of the aforementioned examples, the annular body 226 may be an integrally formed component or may comprise two or more components that are separable. Although the visual indicator 114 according to the aforementioned embodiments is an LED light ring, dispensers according to other embodiments may use different visual indicators, such as an LED light strip, a plurality of individually housed LED lights, or a single LED. Further, visual indicators according to additional embodiments may include incandescent light bulbs, halogen light bulbs, fluorescent light bulbs, or any combination of incandescent, fluorescent, and LED bulbs. It is also contemplated that the annular body 226 could house a luminescent structure, such as a tape, paint, or other artificially luminescent article. In different embodiments, a natural luminescent structure or organism could be provided within the annular body 226.

Figure 13:
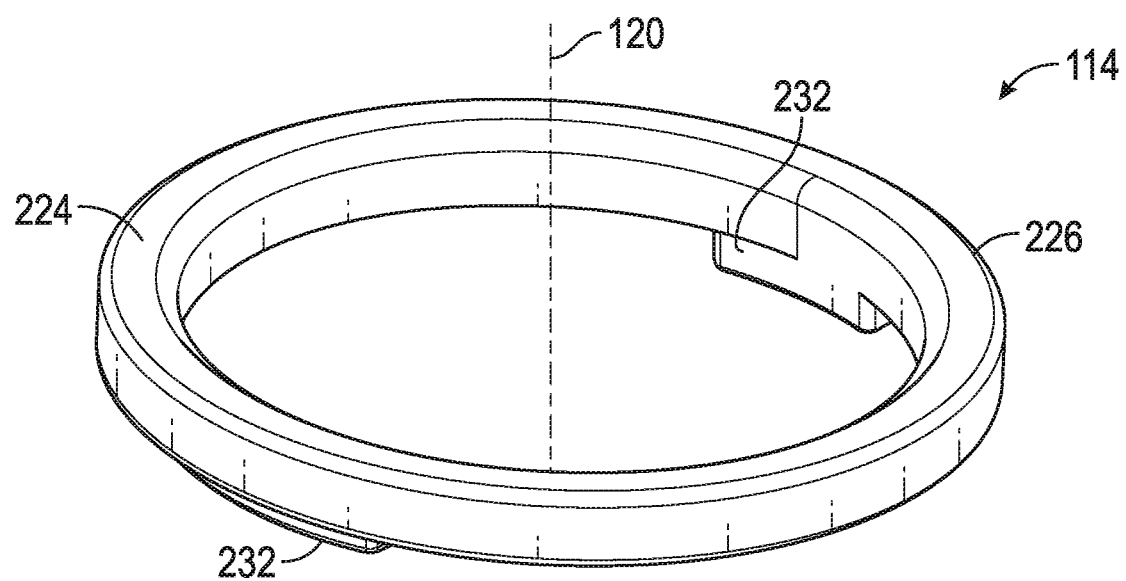
FIG. 13 is a front isometric view of the visual indicator of FIG. 8.
Figure 14:
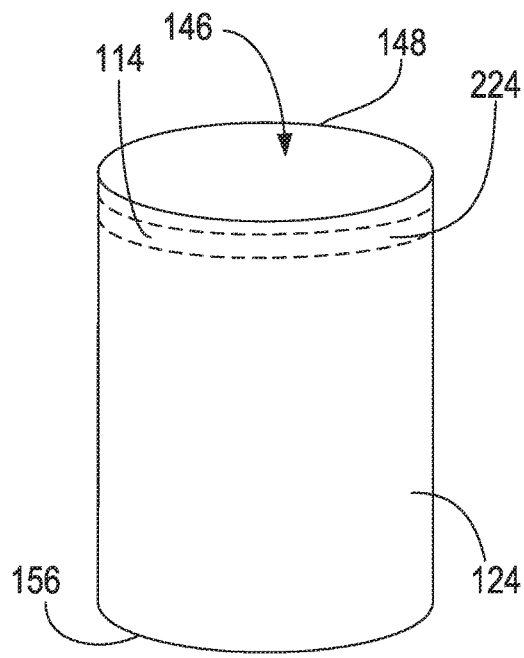
FIG. 14 is a schematic view of a dispenser and a visual indicator, according to an embodiment of the present disclosure.

As best seen in FIG. 13, in the present embodiment, the visual indicator 114 includes the annular body 226 having two securing legs 232 that extend from opposing sides thereof substantially parallel to the longitudinal axis 120. The annular body 226 may be transparent or translucent as to amplify, project, or diffuse light from the LEDs 228 disposed adjacent thereto. As will be described later, the securing legs 232 are configured to be received by a portion of the upper casing 124 for securing purposes; however, the light ring 224 may attach to or couple to the housing 104 in other ways. For example, in some embodiments, the light ring 224 may include internal threads disposed on a surface thereof that are configured to engage and couple to external threads disposed on the upper casing 124 at the first upper end 148. In some embodiments, the light ring 224 may be configured to be received by a recess defined by the upper casing 126 and/or secured in place with fasteners. In some embodiments, the light ring may include extensions that are configured to be received by openings on the upper casing 126 and are configured to snap into place. In some embodiments, one or more latches may be used to secure the light ring 224 to the upper casing 126. Further, in some embodiments, the light ring 224 may be integrally formed with the housing 104 or bonded to the housing 104 using an adhesive. Although the illustrated embodiment shows the visual indicator 114 with two securing legs 232, additional embodiments may use more, fewer, or no securing legs 232. The securing legs 232 may be configured to contact a power source that provides power to the light ring 224. Alternatively, the annular body 226 of the light ring 224 may be configured to contact a power source directly to power the light ring 224. Furthermore, more securing legs 232 than those shown may be used for either retaining purposes or powering purposes. That is, in some embodiments, the light ring 224 may comprise one or more securing legs 232 configured to retain the light ring 224 and/or one or more securing legs 232 configured to contact a power source.

As discussed above, the light ring 224 in the embodiment illustrated may be configured to provide 360 degree visual indication to a user. That is, the light ring 224 may be designed to be visible from all angles around the dispenser 102 (or axis 120), thereby providing a 360 degree effective viewing angle. This feature is particularly useful in enhancing a user's experience because existing dispensers commonly include few to no visual indicators. Visual indictors on existing dispensers are typically designed to be seen only from a specific or limited effective viewing angle (e.g., front view). Consequently, it is difficult for a user to identify the dispenser's state of operation. To remedy this issue, the light ring 224 according to embodiments of the present disclosure may provide a broad effective viewing angle. In some embodiments, LEDs may be disposed adjacent the light ring 224 along an entire circumference thereof, but in other embodiments, LEDs may be disposed adjacent the light ring 224 along only a portion of the annular body 226. For example, LEDs may only be adjacent the annular body 226 for 270 degrees thereof. Preferably, LEDs occupy at least 180 degrees of the annular body 226, but LEDs may occupy 250, 210, 180, 140, 110, 90, 75, or 40 degrees of the annular body 226 in alternative embodiments.

Figure 15:
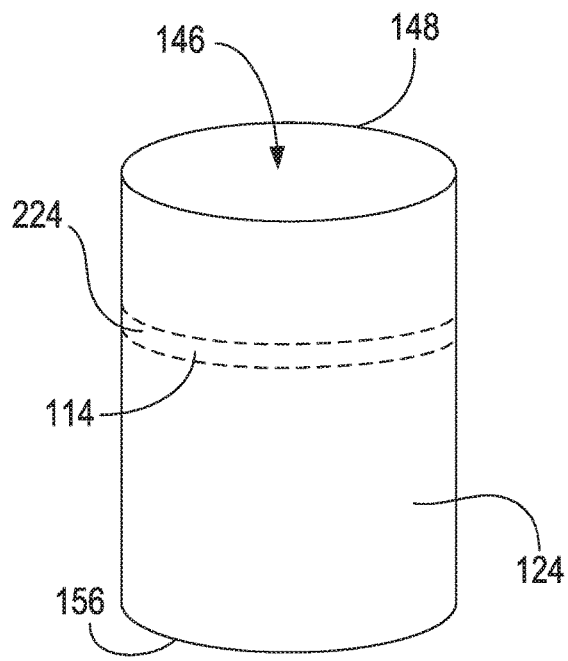
FIG. 15 is a schematic view of a dispenser and a visual indicator, according to another embodiment of the present disclosure.
Figure 16:
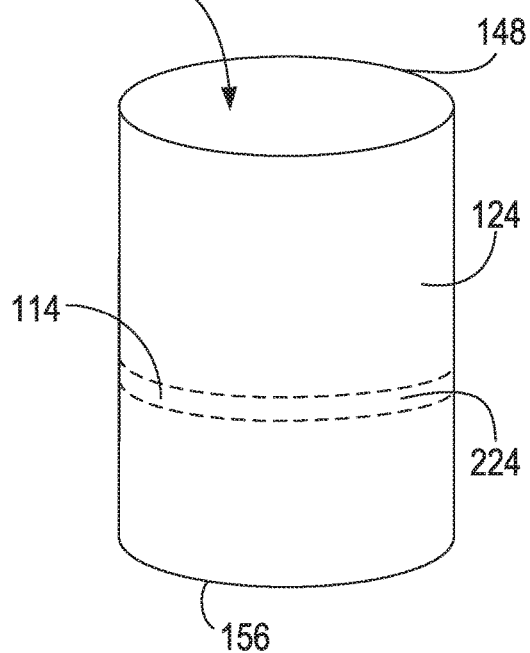
FIG. 16 is a schematic view of a dispenser and a visual indicator, according to still another embodiment of the present disclosure.
Figure 17:
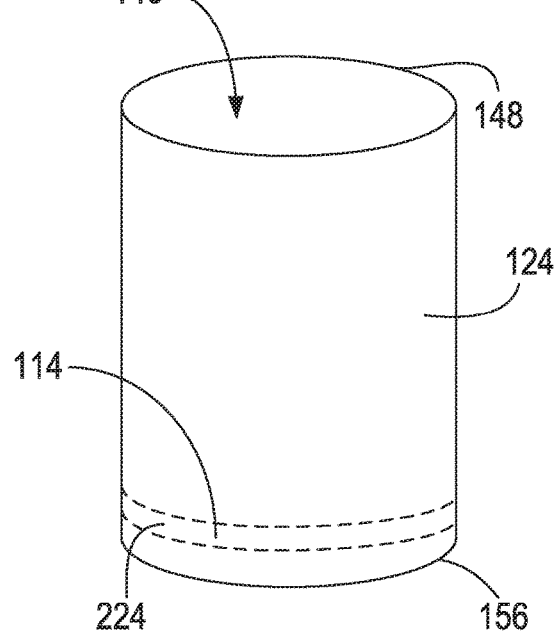
FIG. 17 is a schematic view of a dispenser and a visual indicator, according to yet another embodiment of the present disclosure.
Figure 18:
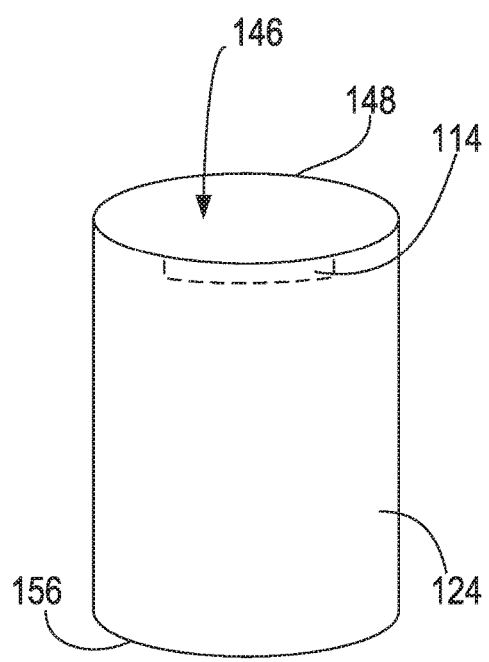
FIG. 18 is a schematic view of a dispenser and a visual indicator, according to another embodiment of the present disclosure.
Figure 19:
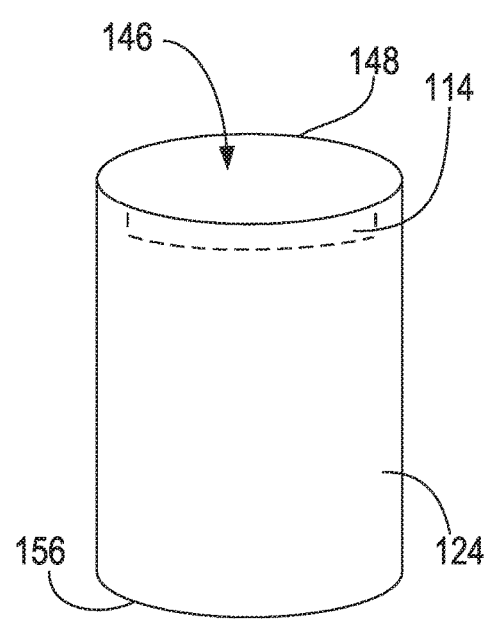
FIG. 19 is a schematic view of a dispenser and a visual indicator, according to still another embodiment of the present disclosure.

Returning to FIG. 9, the visual indicator 114 is configured to be secured to the first upper end 148 of the upper casing 124. More specifically, the securing legs 232 (see, e.g., FIG. 13) are configured to be held within receiving openings 234 defined by the inwardly extending lip 152 of the upper casing 124 (see, e.g., FIG. 4). The visual indicator 114 is configured to extend along a circumference of the circular receiving aperture 146 of the upper casing 124, thereby extending around 360 degrees of the dispenser 102. Although the visual indicator 114 is disposed at the first upper end 148 of the upper casing 124, alternative embodiments may provide a dispenser having a visual indicator provided at different locations, as shown in FIGS. 14-17. For example, referring to FIG. 14, according to an embodiment of the present disclosure, the visual indicator 114 may be disposed just below the first upper end 148 of the upper casing 124. Referring to FIGS. 15 and 16, alternatively, the visual indicator 114 may be disposed between the first upper end 148 and the second upper end 156 of the upper casing 124. Referring to FIG. 17, the visual indicator 114 may be positioned at or adjacent the second upper end 156 of the upper casing 124. Furthermore, turning to FIGS. 18 and 19, in some embodiments, the visual indicator 114 may only extend along a portion of the circumference of the circular receiving aperture 146 of the upper casing 124. Rather, in some embodiments, the visual indicator 114 may comprise a curved body that extends along a portion of the circular receiving aperture 146, such as, e.g., 270, 250, 210, 180, 140, 110, 90, 75, or 40 degrees. The visual indicator thus may be sized to provide a particular effective viewing angle.

Figure 20:
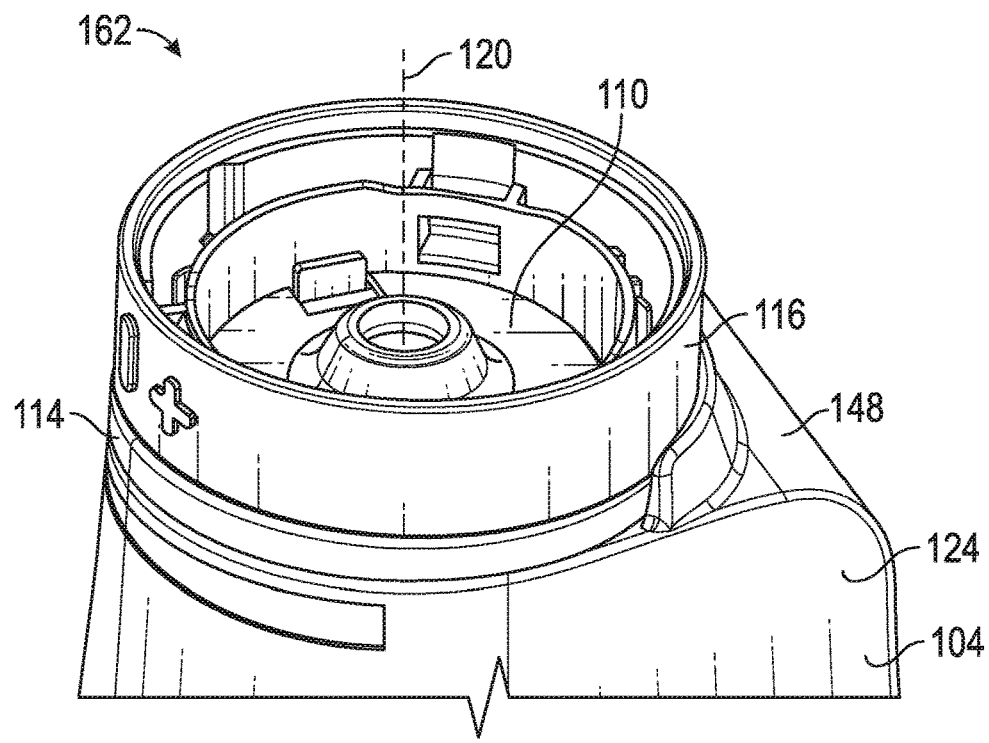
FIG. 20 is a front isometric view of the dispenser of FIG. 8 with the top cover removed.
Figure 21:
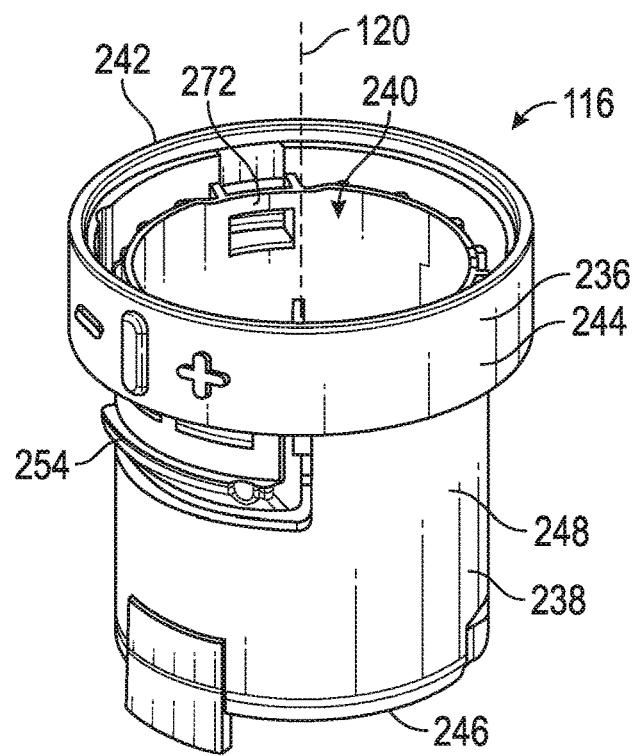
FIG. 21 is a front isometric view of the control ring of FIG. 8.
Figure 22:
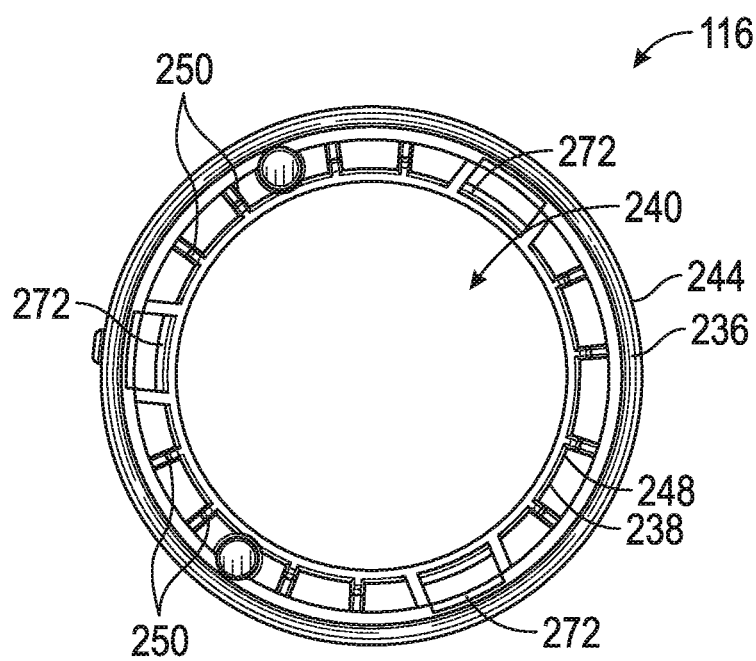
FIG. 22 is a top plan view of the control ring of FIG. 21.

Turning to FIG. 20, the control dial 116 is secured adjacent the visual indicator 114. That is, the visual indicator 114 is configured to be secured between the control dial 116 and the upper casing 124 of the housing 104. FIGS. 21-24 show various views of the control dial 116. Referring particularly to FIG. 21, the control dial 116 is a substantially cylindrical component comprising an upper portion 236 and a lower portion 238 that define a hollow center 240. The upper portion 236 defines a first outer edge 242 and a first outer wall 244, whereas the lower portion 238 defines a second outer edge 246 and a second outer wall 248. As best seen in FIG. 22, which illustrates a top plan view of the control dial 116, the first outer wall 244 has a diameter that is larger than a diameter of the second outer wall 248. Further, the upper portion 236 is integrally secured to the lower portion 238 by a plurality of radially extending ribs 250 extending therebetween.

Figure 23:
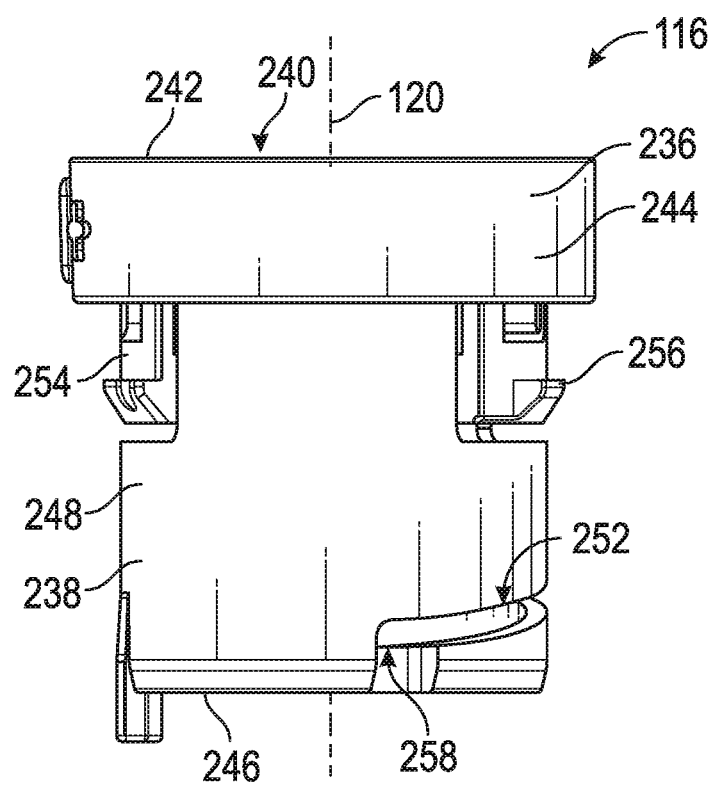
FIG. 23 is a left side elevational view of the control ring of FIG. 21.
Figure 24:
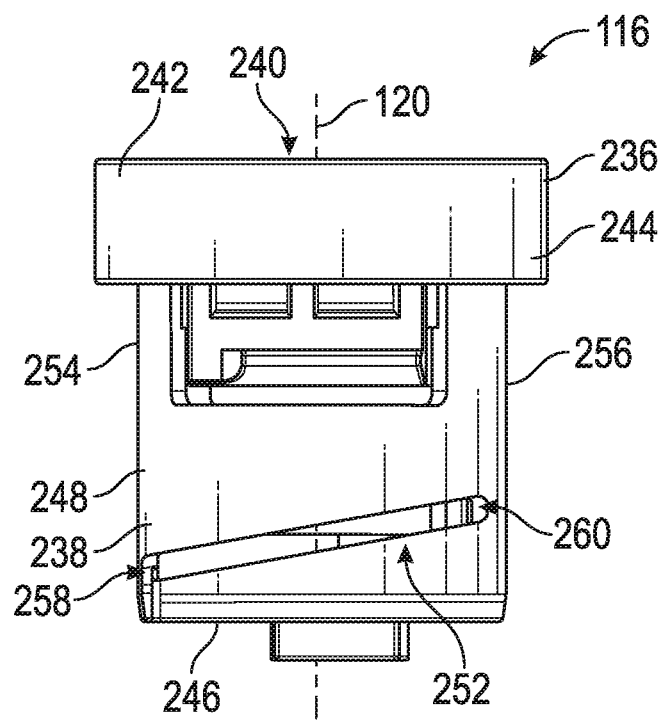
FIG. 24 is a rear elevational view of the control ring of FIG. 21.

Referring to FIGS. 23 and 24, the control dial 116 further includes a spirally extending slot 252, a third latch 254, and a fourth latch 256. The third latch 254 and the fourth latch 256 are provided to secure the control dial 116 in the housing 104 (see, e.g., FIG. 20). Although the illustrated embodiment illustrates the control dial 116 having the third latch 254 and the fourth latch 256 symmetrically disposed thereon, additional embodiments may have more or fewer latches in a variety of orientations. The slot 252 is located within the lower portion 238 and extends spirally through the second outer wall 248. That is, a first slot end 258 of the slot 252 is disposed proximate the second outer edge 246, and the slot 252 extends spirally toward the first outer edge 242 and a second slot end 260. In some instances, the slot 252 may extend more than ninety degrees about the axis 120. Further, in some instances, the slot 252 may extend more than one hundred and ten degrees about the axis 120. Preferably, the slot 252 extends between 90 degrees and 180 degrees around axis 120. In the embodiment illustrated, the slot 252 extends approximately 130 degrees about the axis 120.

Figure 25:
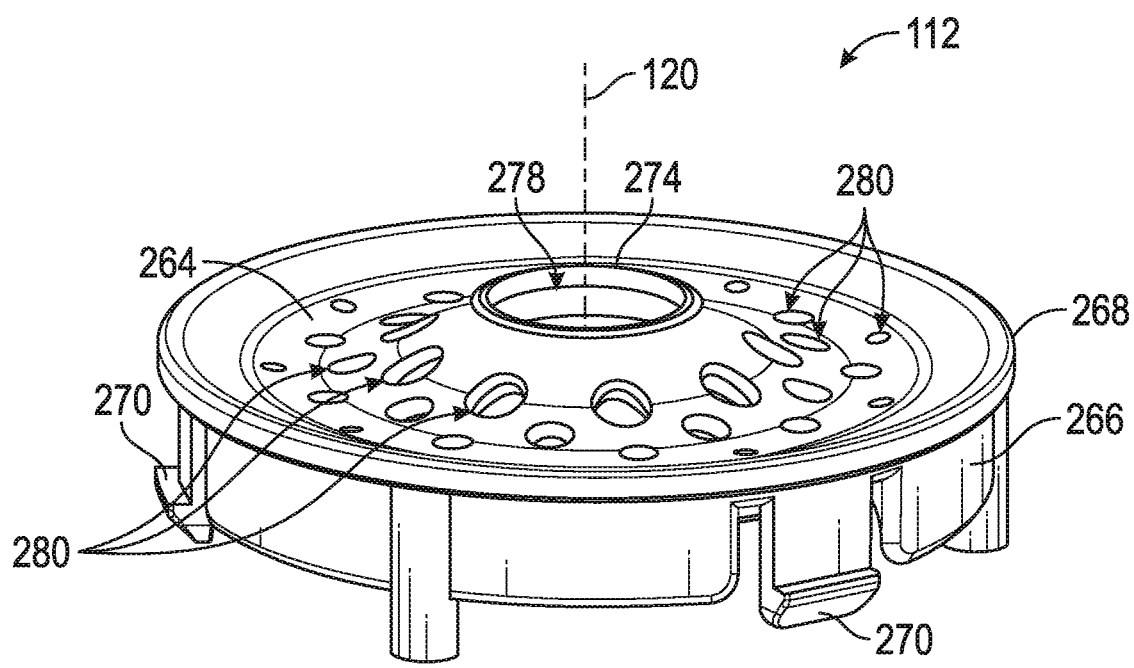
FIG. 25 is a front isometric view of the top cover of FIG. 8.
Figure 26:
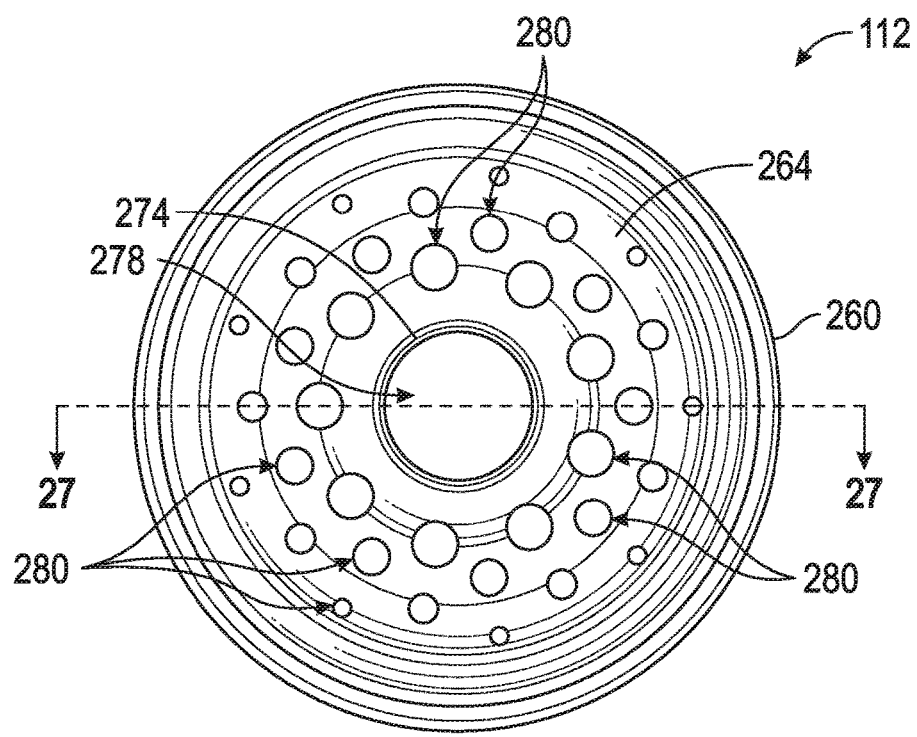
FIG. 26 is a top plan view of the top cover of FIG. 25.
Figure 27:
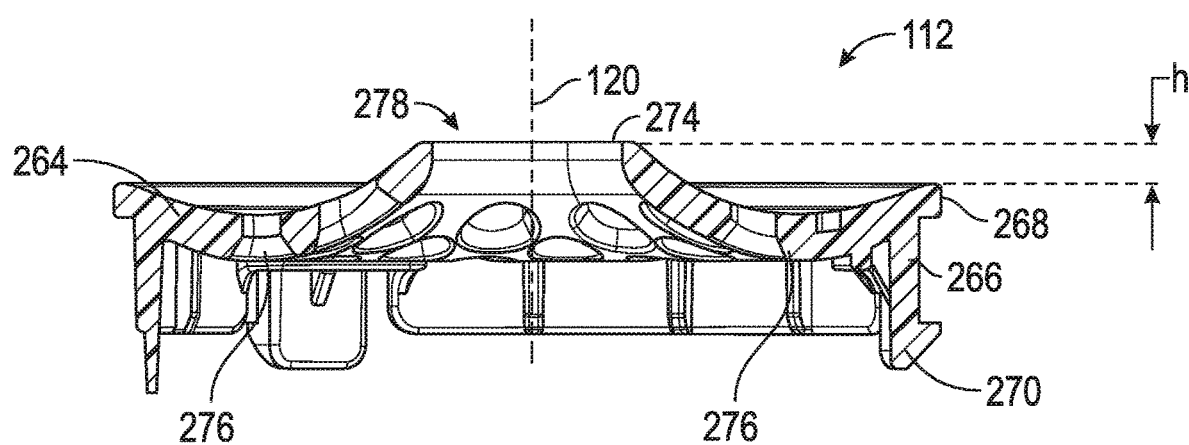
FIG. 27 is a cross-sectional view of the top cover taken along line 27-27 of FIG. 26.

FIGS. 25-27 show various views of the top cover 112. Referring particularly to FIG. 25, the top cover 112 includes a circular wall 264 having an annular rim 266 extending from a peripheral edge 268 thereof. The annular rim 266 comprises a plurality of latches 270 that are configured to be received and secured by receiving portions 272 of the control dial 116 (see, e.g., FIG. 21). In the illustrated embodiment, the top cover 112 includes three latches 270, however, alternative embodiments may include more or fewer latches.

Still referring to FIGS. 25-27, the circular wall 264 of the top cover 112 includes an interior edge 274 disposed inwardly from the peripheral edge 268. As best seen in FIG. 27, the peripheral edge 268 and the interior edge 274 are oriented on different planes so that the interior edge 274 defines an upper most portion of the top cover 112. In the illustrated embodiment, the interior edge 274 and the peripheral edge 268 are spaced apart by a distance h. In some instances, the distance h may be greater than 2 millimeters ("mm"). In some instances, the distance h may be greater than 8 mm. Further, the circular wall 264 extends from the peripheral edge 268 toward the interior edge 274 in a concave fashion. More specifically, the circular wall 264 extends downwardly in a first direction, e.g. downwardly in a concave manner, toward a trough 276. From the trough 276, the circular wall 264 curves in a second direction, e.g., upwardly in a concave manner, until it meets the interior edge 274. Thus, the circular wall 264 defines a curved wall, and the interior edge 274 defines a central aperture 278.

Referring now to FIG. 26, the circular wall 264 further defines a plurality of apertures 280 arranged around the central aperture 278. In the embodiment illustrated, the plurality of apertures 280 decrease in size as they are positioned farther from the central aperture 278. That is, the plurality of apertures 280 proximate the peripheral edge 268 are smaller than the plurality of apertures 280 proximate the interior edge 274. The plurality of apertures 280 may be incorporated to provide venting capabilities. Additional embodiments of the present disclosure may include a top cover having more, fewer, or no apertures in a variety of designs and configurations.

Figure 28:
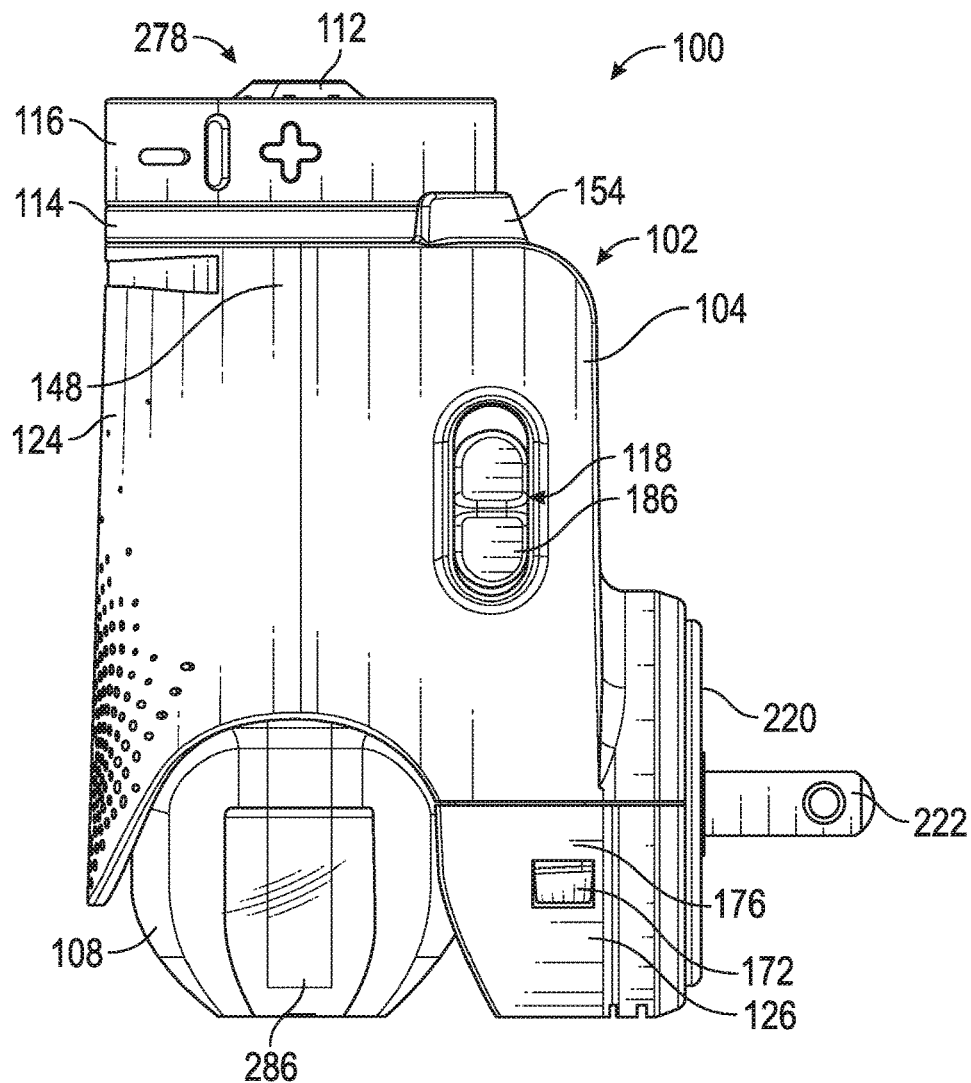
FIG. 28 is a left side elevational view of the dispensing system of FIG. 1.
Figure 29:
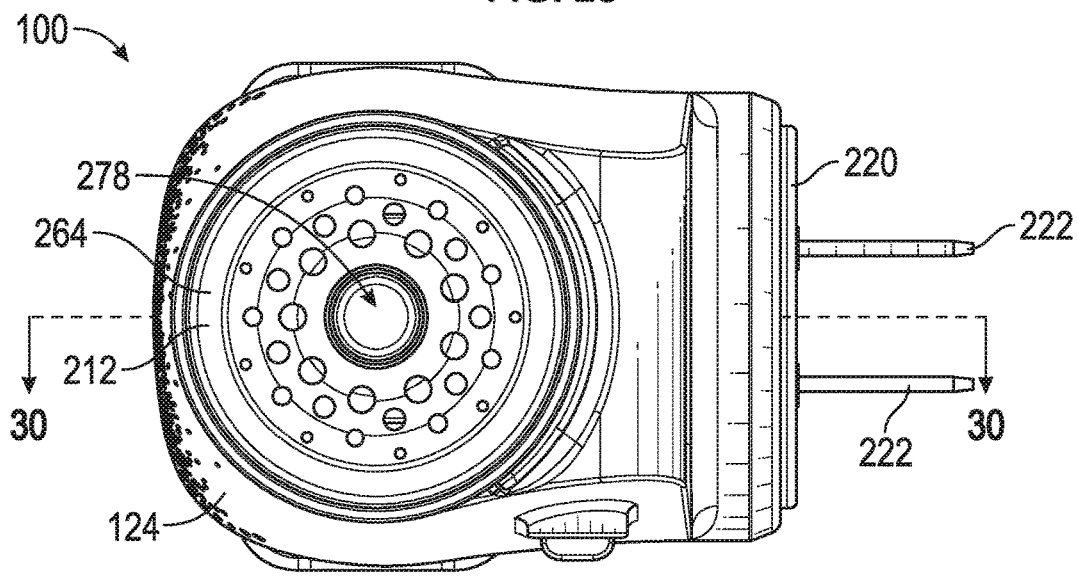
FIG. 29 is a top plan view of the dispensing system of FIG. 1.
Figure 30:
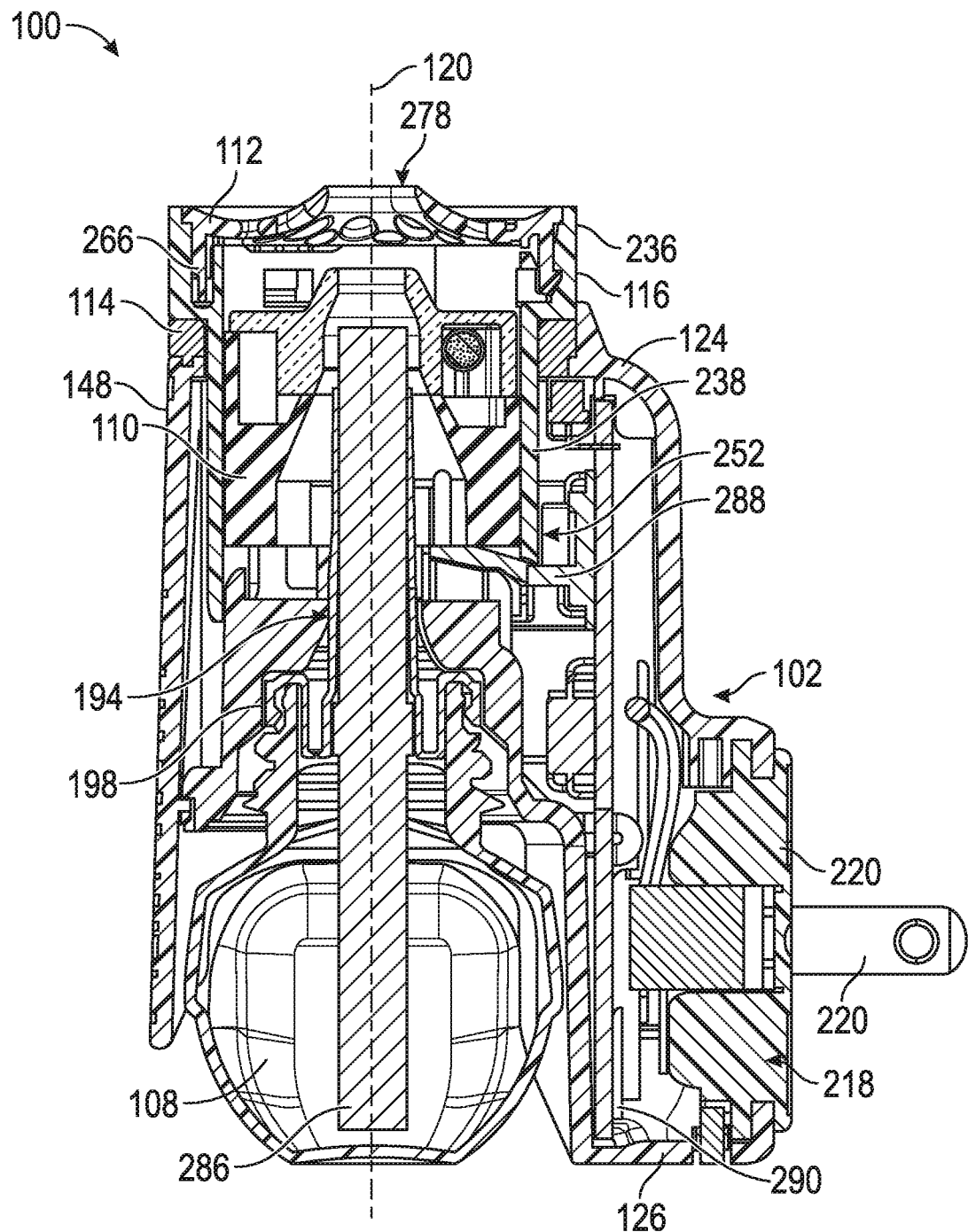
FIG. 30 is a cross-sectional view of the dispensing system taken along line 30-30 of FIG. 29.
Figure 31:
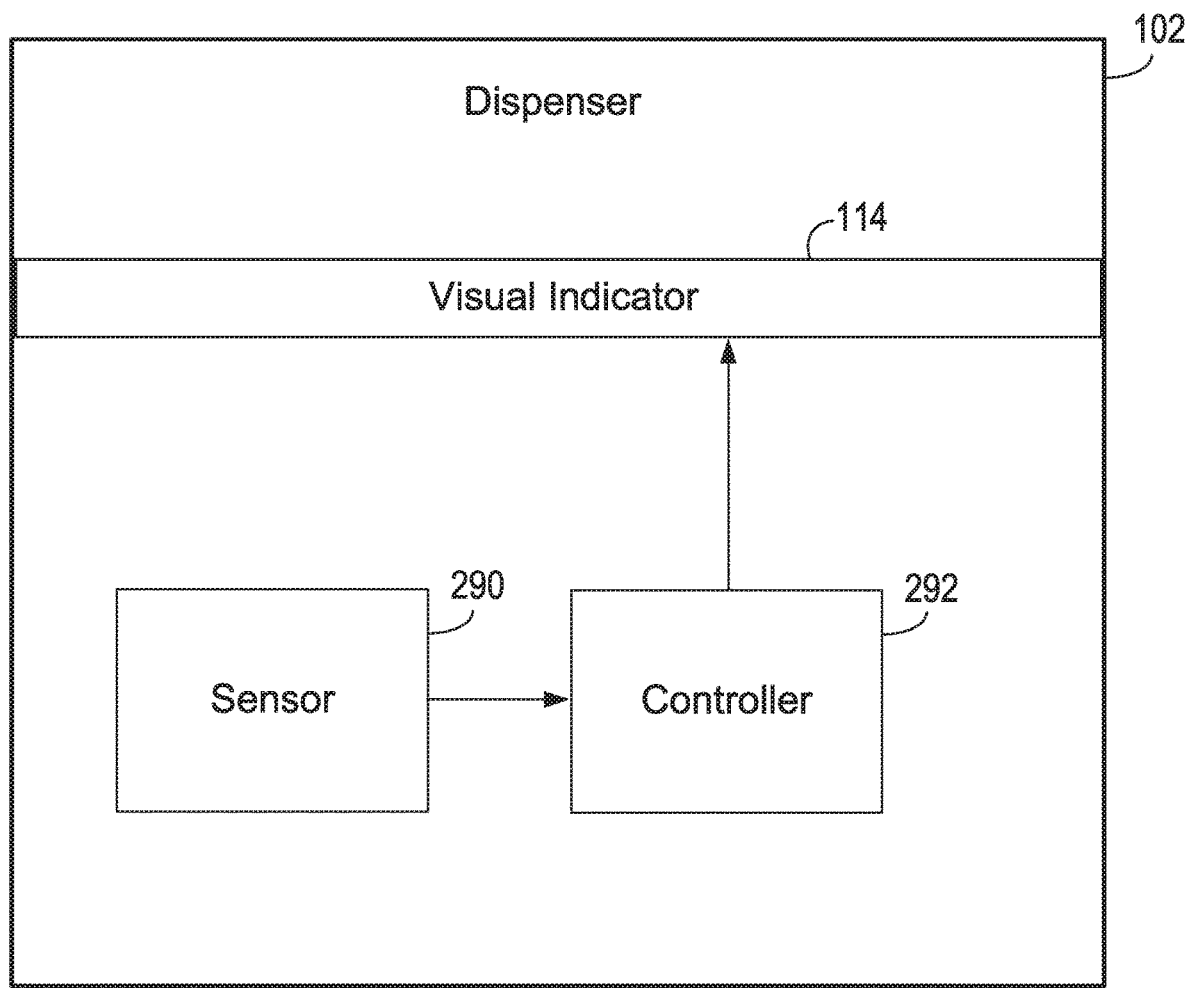
FIG. 31 is a schematic representation of a dispensing system, according to an embodiment of the present disclosure.

FIGS. 28 and 29 provide a side elevational view and a top plan view of the dispenser assembly 100, respectively. FIG. 30 illustrates a cross-sectional view of the dispenser assembly 100 taken across line 30-30 of FIG. 29. As shown in FIG. 30, the channel 194 of the lower casing 126 is configured to receive a wick 286 of the container 108 therein, and the fastening portions 198 are configured to grasp a portion of the container 108 to secure the container 108 therein. Further, the slot 252 of the control dial 116 is configured to receive an intensity switch arm 288 that may be a component of the diffusion element 110 therein. Rotational movement of the control dial 116 thus would result in translation of the intensity switch arm 288 in an axial direction defined by the axis 120, which results in activation or deactivation of an electronic control that is configured to control a dispensing intensity of the flowable medium held in the container 108. More specifically, in instances where the diffusion element 110 comprises a heater arrangement, the intensity switch arm 288 is configured to communicate with a controller (such as, e.g., controller 292 in FIG. 31) to modify a temperature of the heater. Additionally or alternatively, in instances where the diffusion element 110 comprises a fan arrangement, the intensity switch arm 288 is configured to communicate with a controller (such as, e.g., controller 292 in FIG. 31) to modify an intensity of the fan arrangement. Furthermore, in other embodiments, the intensity switch arm 288 may control the wick's 286 proximity to the diffusion element 110 by moving one or more of diffusion element 110 or wick 286, which may affect the dispensing intensity of the flowable medium.

In the illustrated embodiment, for example, if the control dial 116 is rotated completely clockwise, the diffusion element 110 may operate at a lower intensity (e.g., a heater may operate at a lower temperature) and the dispenser 102 may dispense less flowable medium than if the control dial 116 is rotated completely counterclockwise. In an alternative embodiment, if the control dial 116 is rotated completely counterclockwise, the diffusion element 110 may operate at a lower intensity (e.g., a heater may operate at a lower temperature) and the dispenser 102 may dispense less flowable medium than if the control dial 116 is rotated completely clockwise. Furthermore, the dispenser assembly 100 may be configured to have a number of pre-set dispensing intensities that the intensity switch arm 288 is configured to achieve. For example, the diffusion element 110 may be configured to operate at three pre-set intensities: low, medium, and high. In embodiments where the diffusion element 110 comprises a heater, the heater may operate at temperatures according to the pre-set intensities. If the control dial 116 is rotated completely clockwise so that the intensity switch arm 288 is disposed at the second slot end 260 (see, e.g., FIG. 24), the diffusion element 110 (e.g., the heater) may operate at the low intensity (e.g., a low temperature). If the control dial 116 is rotated so that the intensity switch arm 288 is disposed along a length of the slot 252 between the first slot end 258 and the second slot end 260 (see, e.g., FIG. 24), the diffusion element 110 (e.g., the heater) may operate at the medium intensity (e.g., a medium temperature). Further, if the control dial 116 is rotate completely counterclockwise so that intensity switch arm 288 is disposed at the first slot end 258 (see, e.g., FIG. 24), the diffusion element 110 (e.g., the heater) may operate at the high intensity (e.g., a high temperature). It is also contemplated that the intensity of the diffusion element 110 may incrementally ramp up or down accordingly as the control dial 116 rotates clockwise and/or counterclockwise, which may include more or fewer discrete steps in the change of intensity. It is further contemplated that in some embodiments, the control dial 116 may provide for a continuous change in intensity comprising discrete changes in intensity that are relatively unperceivable to the user but appear to provide a spectrum between off and full intensity.

The dispenser 102 according to the present embodiment may further include a sensor 290 that is configured to monitor a fill level of the container 108. In the embodiment illustrated, the sensor 290 is a capacitance sensor, however, the sensor 290 may be any type of sensor commonly used in the art to measure fluid levels, such as a magnetic or mechanical float, a pressure sensor, or an optical sensor. The sensor 290 is configured to monitor and communicate a fill level of the flowable medium in the container 108. That is, referring to FIG. 31, the sensor 290 may communicate the fill level of the container 108 to a controller 292, and the controller 292 may adjust a brightness intensity, pulsing (or flashing) cadence, and/or color of the visual indicator 114 on the dispenser 102 to visually indicate the dispenser's fill level. Additionally or alternatively, in some embodiments, the dispenser 102 may include one or more sensors that are configured to monitor various parameters. For example, in some embodiments, sensors may be used to communicate a dispensing intensity change to a controller, which may adjust the visual indicator 114. Further, in some embodiments, a sensor may be used to monitor and communicate the dispenser's power status.

As mentioned above, dispensing systems according to embodiments of the present disclosure are intended to provide interactive and intuitive indication to a user. Therefore, a dispenser according to embodiments of the present disclosure may incorporate a visual indicator, such as the visual indicator 114 shown in FIGS. 1-30, to provide visual feedback to a user. Generally, visual indicators according to embodiments of the present disclosure are configured to provide visual indications or feedback sequences that are defined by particular parameters, such as, for example, color, brightness, pulsing, and flashing. Therefore, visual indicators according to embodiments of the present disclosure are generally configured to provide at least one color, brightness, pulsing sequence, and/or flashing sequence. In some embodiments, a visual indicator may be configured to emit at least two colors. That is, the visual indicator may be configured to switch between two colors. In some embodiments, a visual indicator may be configured to emit at least two brightness intensities. Further, in some embodiments, a visual indicator may be configured to emit at least two pulsing (or flashing) sequences.

FIGS. 32-35 illustrate examples of visual indications or feedback sequences according to embodiments of the present disclosure. For the purpose of description, a dispenser is considered to be in an on state if the dispenser is powered. That is, if the dispenser has a diffusion element comprising a powered component, such as, e.g., a fan or a heater, the powered component would be powered or operational for its intended use when the dispenser is in the on state. Conversely, the dispenser is considered to be in an off state if the dispenser and, accordingly, the powered component is not powered or operational for its intended use. Further, if the dispenser includes a visual indicator, the visual indicator is generally not powered when the dispenser is in the off state. The dispenser may be in a sleep state when the powered component is not operational for its intended use, but still provides visual indication. For example, in embodiments where the diffusion element comprises a heater, the heater may not be powered or may be in a low power mode when the dispenser is in the sleep state. Generally, when in the sleep state, the powered component is not operational for its intended use for a temporary amount of time, or dispenses a low quantity of flowable medium, but the visual indicator may still actively provide visual indication. That is, the visual indicator is still powered in the sleep state. As described above, a dispenser according to embodiments of the present disclosure may include capabilities to automatically transition into a sleep state interval. For example, a switch may be activated, which initiates the sleep state interval during which the dispenser may be in the on state for sixteen hours of a day and automatically transitions into the sleep state for eight hours. After remaining in the sleep state for eight hours, the dispenser may automatically return to the on state. When or as a dispenser according to embodiments of the present disclosure transitions between the aforementioned states, the visual indicator may emit a visual indication or feedback sequence. Further, during each of the on state, off state, and sleep state, the visual indicator may emit different visual indications or feedback sequences, which will be described in greater detail below.

Further, again for purpose of description, a container attached to a dispenser and holding a flowable medium, such as the container 108 shown in FIG. 1, is in a filled state if the container has at least a preset minimum amount of the flowable medium held therein. In some instances, the preset minimum may be 25% of an internal volume of the container 108. For example, the preset minimum may be 10% of the internal volume. This preset minimum may vary from 0% to 99% of the internal volume. In some instances, the preset minimum may be a percentage reduction in volume of the flowable medium held in the container 108. For example, the preset minimum may be when 75%, 80%, or 85% of the flowable medium is dispensed from the internal volume of the container. The container would be in a low state if the container has less than the preset minimum amount of the flowable medium held therein. For example, if a dispenser has a preset minimum of 15% of the internal volume of the container, the container would be in the filled state if a flowable medium occupies at least 15% of its internal volume, and the container would be in the low state if the flowable medium occupies less than 15% of its internal volume. As another example, if a dispenser has a preset minimum of 90% reduction in volume of the flowable medium held in the container, the container would be in the filled state if the flowable medium has experienced a volume reduction of less than or equal to 90%, and the container would be in the low state if the flowable medium has experienced a volume reduction of greater than 90%. Similarly to the on, off, and sleep states described above, when or as a container for a dispenser according to embodiments of the present disclosure transitions between the aforementioned states, the visual indicator may emit a visual indication or feedback sequence. Further, when the container is in one of the filled state and the low state, the visual indicator may emit different visual indications or feedback sequences, which will be described in greater detail below.

Figure 32:
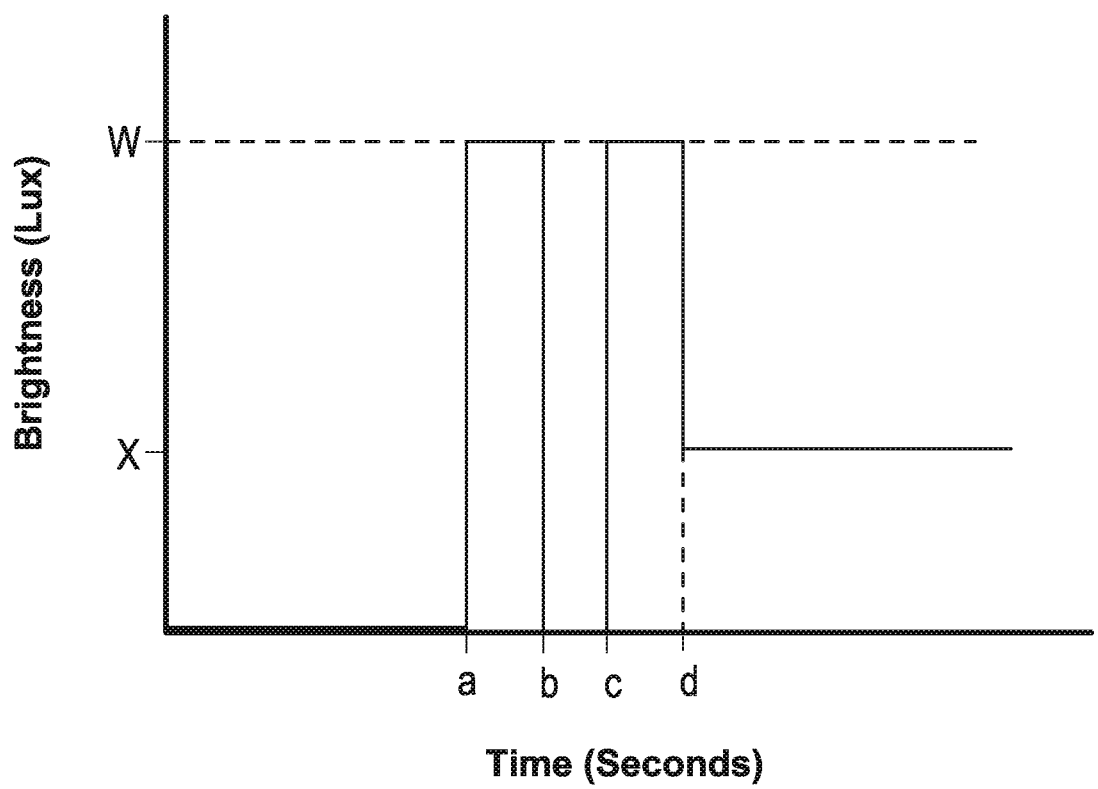
FIG. 32 is a graph that illustrates visual feedback from a visual indicator of a dispensing system as the dispenser enters an on state, according to an embodiment of the present disclosure.

FIG. 32 illustrates an example visual indication or feedback sequence of a visual indicator as a dispenser transitions from the off state to the on state, according to an embodiment of the present disclosure. When in the off state, the visual indicator is not powered, so no visual indication is provided. When (or as) the dispenser is plugged in (or powered on), the visual indicator may emit a first visual indication. The first visual indication may be a feedback flash. For example, the visual indicator may provide two, back-to-back 0.25 second flashes (a-b seconds and c-d seconds) in which the visual indicator may have a brightness of "W" lux. However, it is contemplated that the time duration of the flashes may vary. After completing the feedback flash, the visual indicator may emit a second visual indication (at d seconds). The second visual indication may be a steady-state brightness, in which the visual indictor emits a particular brightness of "X" lux. In the embodiment illustrated, the steady-state brightness of "X" lux is less than the feedback flash of "W" lux, however, "X" lux may be greater than or equal to "W" lux in alternative embodiments. Further, the steady-state brightness and the feedback flash may be tailored to meet a user's preferences. Although the visual indication sequence shown in FIG. 32 relates to a change in brightness (or lux) when a dispenser transitions from the off state to the on state, a dispenser according to other embodiments of the present disclosure may use other types of visual indications when transitioning from the off state to the on state, such as flashing, pulsing, change in color, or various light patterns. Similarly, although FIG. 32 illustrates a steady brightness (or lux) when the dispenser is in the on state, dispensers according to alternative embodiments may pulse, flash, change color, or produce various light patterns when in the on state.

Figure 33:
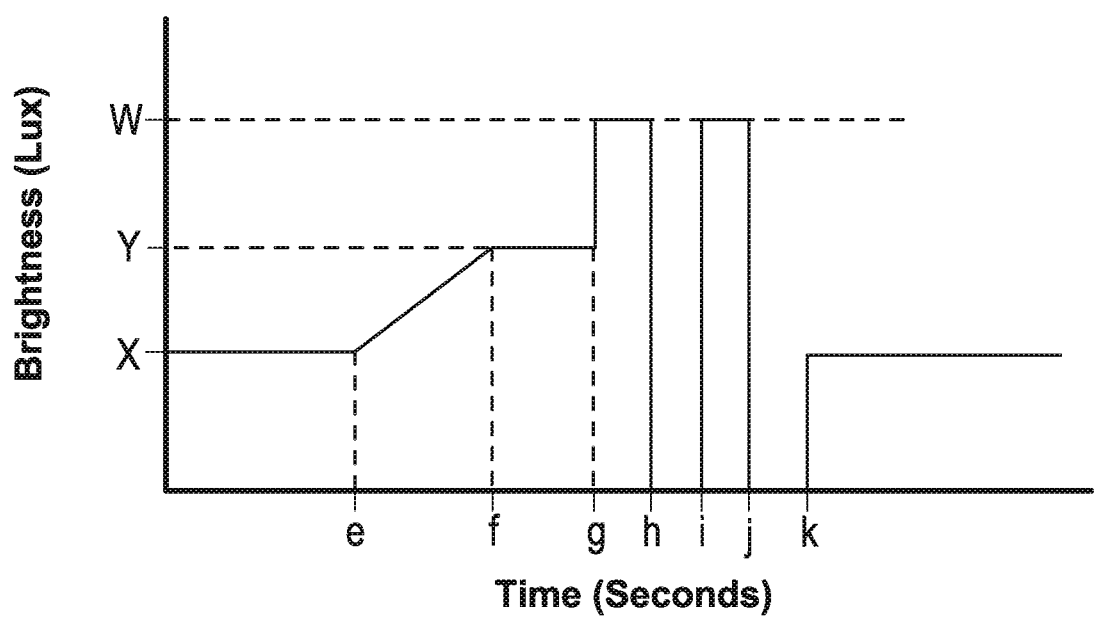
FIG. 33 is a graph that illustrates visual feedback from a visual indicator of a dispensing system as a dispensing intensity changes, according to an embodiment of the present disclosure.

FIG. 33 illustrates another example visual indication or feedback sequence of the visual indicator when (or as) a control dial, like the control dial 116 in FIGS. 21-24, is adjusted. First, the dispenser is in the on state, so the visual indicator may emit the steady-state brightness of "X" lux. When (or as) the control dial is rotated counterclockwise, i.e., when (or as) the control dial is rotated to increase the dispensing intensity, the visual indicator may synchronously increase in brightness until the dial stops rotating (e-f seconds). In the illustrated embodiment, the brightness gradually and continuously increases from "X" lux to "Y" lux. Additionally or alternatively, the brightness of the visual indicator may incrementally increase from "X" lux to "Y" lux in a step-wise fashion to give the appearance of being continuous or otherwise may increase in a step-wise manner that is apparent to a user that they are switching to a different discrete level of brightness. After rotation of the dial, the visual indicator may remain at a brightness of "Y" lux for f-g seconds, e.g., 0.95 seconds, before providing the feedback flash of "W" lux, as described above (g-h and i-j seconds). The visual indicator may then return to its steady-state brightness of "X" lux (at k seconds). Although the visual indication sequence shown in FIG. 33 relates to a change in brightness (or lux) when a dispenser's dispensing intensity changes, a dispenser according to other embodiments of the present disclosure may use other types of visual indications when (or as) its dispensing intensity changes, such as flashing, pulsing, change in color, or various light patterns. Further, although FIG. 33 illustrates a visual indication as a dispenser's dispensing intensity increases, it is to be understood that this exemplary visual indication may also apply as the dispenser's dispensing intensity decreases in an identical or related manner. For example, when the dispenser's dispensing intensity is decreased, the visual indicator may decrease it's brightness during time period e-f, have a steady brightness for time period f-g, provide a feedback flash during time periods g-h and i-j, and then return to its steady-state brightness of "X" lux at k seconds (see FIG. 33).

Figure 34:
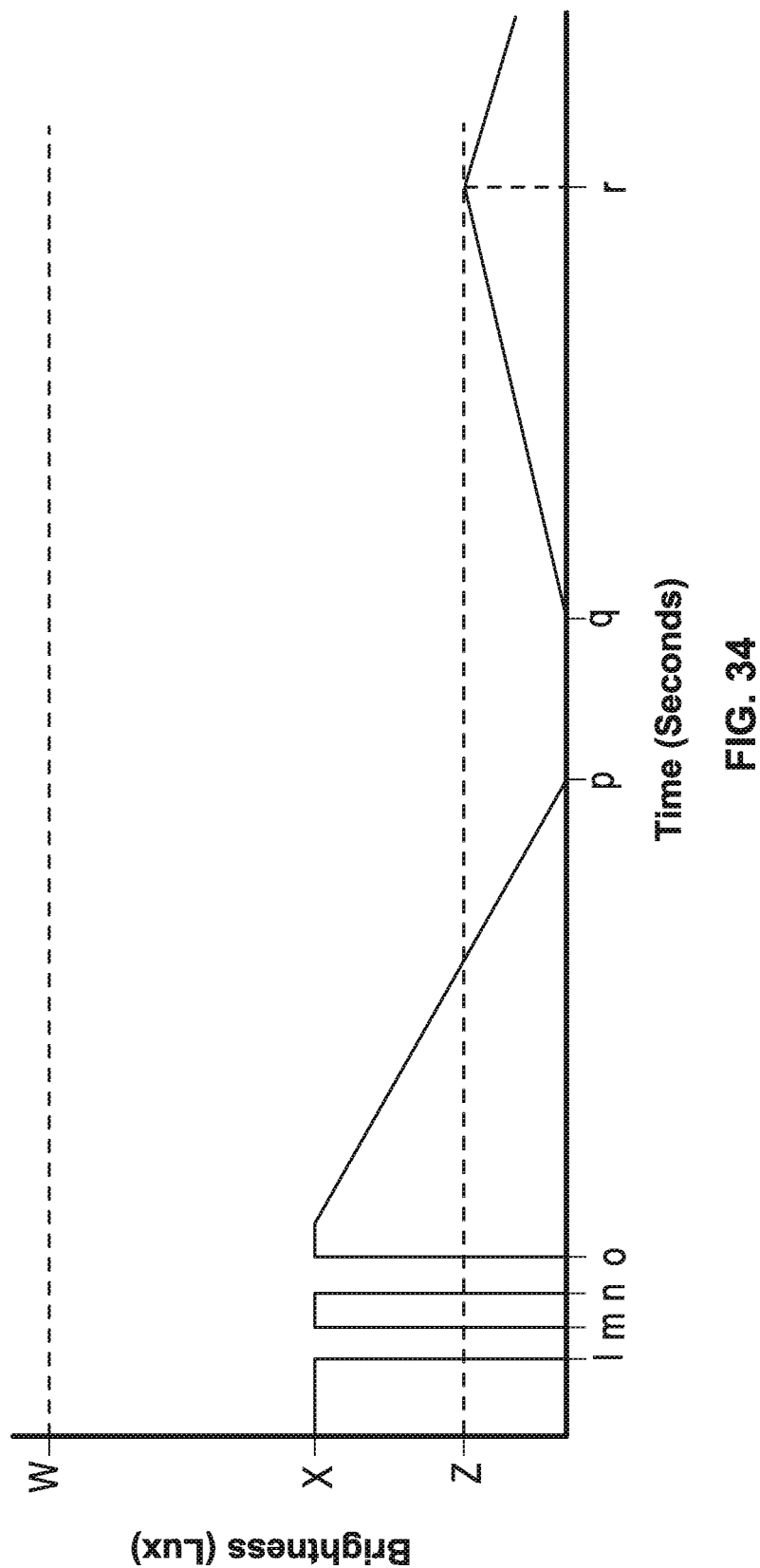
FIG. 34 is a graph that illustrates visual feedback from a visual indicator of a dispensing system as the dispensing system enters a sleep state, according to an embodiment of the present disclosure.

FIG. 34 illustrates still another example visual indication or feedback sequence of the visual indicator when (or as) the dispenser enters the sleep state. As described above, the dispenser may be configured to automatically enter the sleep after a set amount of time. When (or as) the dispenser enters the sleep state, the visual indicator may provide a feedback flash. More specifically, the visual indicator may flash off from the steady-state brightness of "X" lux twice for time durations of m-l seconds and o-n seconds, or approximately 0.25 seconds. After providing the feedback flash, the visual indicator may pulse slowly throughout the sleep state duration. That is, the visual indicator may gradually decrease its brightness from "X" lux until no light is emitted (o-p seconds), and then it may gradually increase its brightness until it reaches "Z" lux (q-r seconds). The visual indicator may repeat this process throughout the entirety of the sleep state. In the embodiment illustrated, it may take the visual indicator approximately eight second to decrease its brightness (o-p seconds). Then, the visual indicator may proceed to emit no light for approximately q-p seconds (e.g., three seconds) before it gradually increases to "Z" lux over eight seconds (q-r seconds). In the illustrated embodiment, "Z" lux is less than "X" lux; however, in other embodiments, "Z" lux may be greater than or equal to "X" lux. Further, in some embodiments, "Z" lux may be approximately 50% of "X" lux. Moreover, "Z" lux may be less than 40%, 60%, or 70% of "X" lux. The visual indicator would then repeat this process until the dispenser transitions into the on state. Further, although the visual indication sequence shown in FIG. 34 relates to a change in brightness (or lux) when a dispenser enters and is in the sleep state, a dispenser according to other embodiments of the present disclosure may use other types of visual indications when (or as) it transitions into and remains in the sleep state, such as flashing, pulsing, change in color, or various light patterns.

Figure 35:
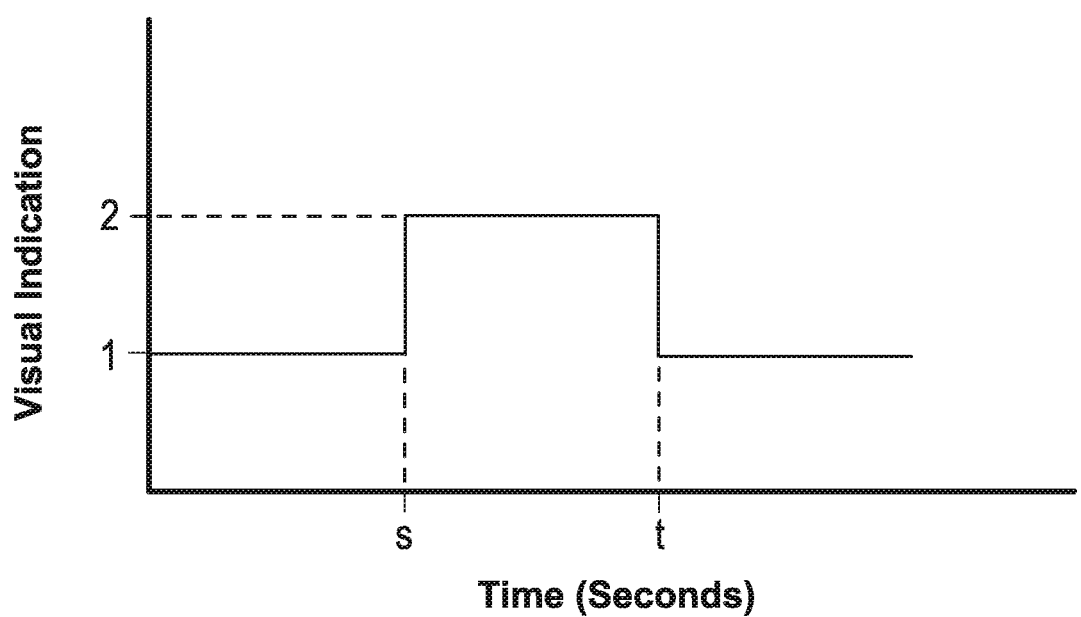
FIG. 35 is a graph that illustrates visual feedback from a visual indicator of a dispensing system as a container of the dispensing system enters a low state, according to an embodiment of the present disclosure.

Further, the dispenser according to embodiments of the present disclosure may be configured to provide visual indication when the container enters the low state. Referring particularly to FIG. 35, the visual indicator may emit a first visual indication when the container is in the filled state and a second visual indication when the container is in the low state. For example, the first visual indication and the second visual indication may be different colors, different brightnesses, or different pulse/flash sequences. Additionally or alternatively, the visual indicator may rapidly pulse or flash when the container is in or enters the low state. It is also contemplated that a visual indicator related to the fill status of the container is only provided with the container enters the low state and that no additional visual indicator beyond those previously discussed for other operational parameters is provided. Further, the dispenser may be configured to automatically turn off when the container remains in the low state for a duration of time. That is, after being in the low state for a duration of time (e.g., one hour), the entire dispenser, including any powered components of a diffusion element and the visual indicator, would no longer be powered until the container is replaced with a refill container, the container is otherwise filled, or until the dispenser is reset (e.g., unplugged).

INDUSTRIAL APPLICABILITY

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

We claim:

1. A method of operating a flowable medium dispenser, the method comprising:
   providing a power source to the flowable medium dispenser that defines an axis, and includes a visual indicator, a housing with an exterior surface facing a surrounding environment, and a central aperture that surrounds the axis;
   dispensing a flowable medium through the central aperture; and rotating a dial to adjust an intensity level at which the flowable medium is dispensed, the dial coupled to the visual indicator and a top cover coupled to the dial; and
   wherein the visual indicator extends around the axis, includes an annular body, and emits light radially outward through the annular body, wherein a bottom surface of the annular body is adjacent a top exterior surface of the housing surrounding the central aperture such that the annular body extends along a circumference of the central aperture of the housing, wherein a horizontal plane is disposed below the annular body, wherein the visual indicator is configured to emit at least two different visual indications, wherein the annular body defines a channel that is configured to at least partially receive at least one LED that is disposed outside of the housing, and wherein, in a use configuration, a container of the dispenser is disposed entirely below the horizontal plane and entirely below the annular body, and retains a wick having a first end and a second end such that the annular body extends around the first end of the wick.

2. The method of claim 1, wherein the flowable medium dispenser further comprises a diffusion element, wherein the diffusion element is configured to be powered by the power source, and wherein the visual indicator is configured to emit a first visual indication when the diffusion element is powered on.

3. The method of claim 2, wherein the visual indicator is configured to emit a second visual indication when the flowable medium dispenser transitions from an off state to an on state.

4. The method of claim 3, wherein the first visual indication is different from the second visual indication.

5. The method of claim 3 further comprising providing a sleep state interval, wherein the visual indicator is configured to emit a third visual indication during the sleep state interval.

6. The method of claim 5, wherein the third visual indication is different from the first visual indication and the second visual indication.

7. The method of claim 6, further comprising detecting a low fill status of the flowable medium, wherein the visual indicator is configured to emit a fourth visual indication when the low fill status is detected.

8. The method of claim 7, wherein the fourth visual indication is different from the first visual indication, the second visual indication, and the third visual indication.

9. The method of claim 1, wherein the visual indicator is configured to emit the at least two different visual indications over at least 180 degrees of a circumference thereof.

10. The method of claim 1, wherein the annular body is a light ring that extends entirely around the axis and the at least one LED is disposed therein.

11. The method of claim 10, wherein the at least one LED includes a plurality of LEDs that are radially spaced about the axis.

12. The method of claim 1, wherein the annular body includes a securing leg that extends downward from the bottom surface of the visual indicator, and wherein the securing leg is configured to be received within a receiving opening defined within an inwardly extending lip of the housing to couple the visual indicator to the top exterior surface of the housing, the inwardly extending lip defining the circumference of the central aperture of the housing.

13. The method of claim 1, wherein a bottom surface of the dial is adjacent a top surface of the visual indicator, and wherein a peripheral edge of the top cover is adjacent an inner wall of the dial.

14. The method of claim 1, wherein the step of rotating the dial adjusts an axial position of an intensity switch arm.

* * * * *